US008761010B2

(12) United States Patent
Jinzaki

(10) Patent No.: US 8,761,010 B2
(45) Date of Patent: Jun. 24, 2014

(54) COMMUNICATION APPARATUS AND COMMUNICATION METHOD

(75) Inventor: Akira Jinzaki, Tokyo (JP)

(73) Assignee: Jin-Magic Inc. (JP)

( * ) Notice: Subject to any disclaimer, the term of this patent is extended or adjusted under 35 U.S.C. 154(b) by 0 days.

(21) Appl. No.: 13/700,070

(22) PCT Filed: May 31, 2010

(86) PCT No.: PCT/JP2010/059221
§ 371 (c)(1),
(2), (4) Date: Mar. 25, 2013

(87) PCT Pub. No.: WO2011/151884
PCT Pub. Date: Dec. 8, 2011

(65) Prior Publication Data
US 2013/0176848 A1    Jul. 11, 2013

(51) Int. Cl.
| | | |
|---|---|---|
| G01R 31/08 | (2006.01) | |
| G06F 11/00 | (2006.01) | |
| G08C 15/00 | (2006.01) | |
| H04L 1/00 | (2006.01) | |
| H04L 12/26 | (2006.01) | |
| H04J 3/14 | (2006.01) | |

(52) U.S. Cl.
USPC ........... 370/230; 370/229; 370/235; 370/241; 370/252; 370/253; 370/468

(58) Field of Classification Search
None
See application file for complete search history.

(56) References Cited

U.S. PATENT DOCUMENTS

| | | | |
|---|---|---|---|
| 2008/0313687 A1* | 12/2008 | Rajakarunanayake | 725/110 |
| 2009/0110000 A1* | 4/2009 | Brorup | 370/468 |
| 2011/0069625 A1* | 3/2011 | Michaelis et al. | 370/252 |

FOREIGN PATENT DOCUMENTS

| | | |
|---|---|---|
| JP | 2008-219812 A | 9/2008 |
| JP | 2009-141565 A | 6/2009 |

OTHER PUBLICATIONS

"European Application Serial No. 10852492.7, Office Action mailed Mar. 12, 2013", 7 pgs.
"European Application Serial No. 10852492.7, Supplementary Search Report mailed Mar. 12, 2013", 2 pgs.
Border, J, et al., "Performance Enhancing Proxies Intended to Mitigate Link-Related Degradations", Network Working Group, (Jun. 2001), 46 pgs.
"International Application Serial No. PCT/JP2010/059221, International Preliminary Report on Patentability dated Jan. 8, 2013", (w/ English Translation), 6 pgs.

(Continued)

*Primary Examiner* — Hassan Phillips
*Assistant Examiner* — Lonnie Sweet
(74) *Attorney, Agent, or Firm* — Schwegman, Lundberg & Woessner, P.A.

(57) ABSTRACT

When a transmitting terminal 2A and a receiving terminal 4B performs communication via a network 10, at a communication apparatus 1 controlling the bandwidth of the communication, a receiving bandwidth measuring unit 23 measures the bandwidth for the communication in at least one direction of the communication in two directions from the transmitting terminal 2A to the receiving terminal 4B and from the receiving terminal 4B and the transmitting terminal 2A. The session table 13 stores information regarding bandwidth adjustment including the target bandwidth required for the communication. The bandwidth adjusting unit 24 reads out, from the session table 13, the target bandwidth in the direction for which the bandwidth was measured, and throttling or enhancing of the bandwidth is performed by adjusting the transmission interval of packets based on the comparison of the bandwidth measured at the receiving bandwidth measuring unit 23 and the read out target bandwidth.

19 Claims, 30 Drawing Sheets

(56) References Cited

OTHER PUBLICATIONS

"International Application Serial No. PCT/JP2010/059221, International Search Report mailed Aug. 31, 2010", 3 pgs.
"International Application Serial No. PCT/JP2010/059221, Written Opinion mailed Aug. 31, 2010", (w/ English Translation), 9 pgs.
"Japanese Application Serial No. 2011-543749, Office Action mailed Apr. 17, 2012", (w/ English Translation), 6 pgs.
"Japanese Application Serial No. 2011-543749, Written Opinion filed Jun. 8, 2012", (w/ English Translation), 5 pgs.
Le Thanh Man, Cao, et al., "ImTCP: TCP with an inline network measurement mechanism", *IEICE Technical Report*, vol. 104, No. 73, (w/ English Translation), (May 2004), 15 pgs.
"European Application Serial No. 10852492.7, Office Action mailed Mar. 21, 2013", 7 pgs.
"European Application Serial No. 10852492.7, Office Action mailed Nov. 18, 2013", 5 pgs.

\* cited by examiner

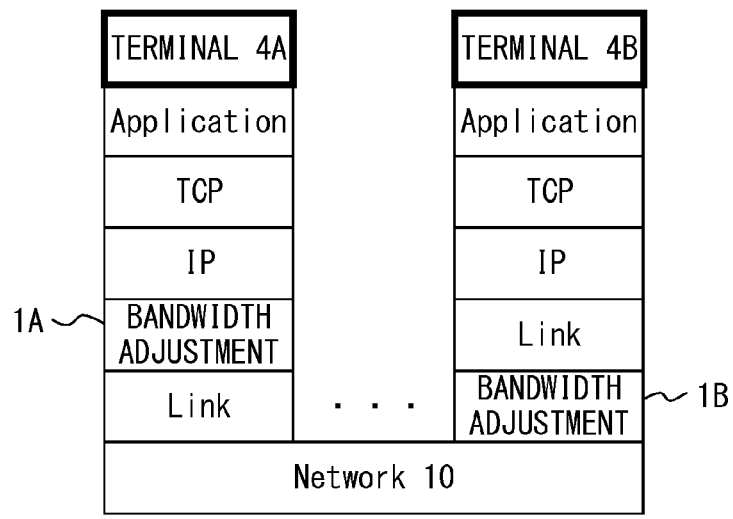
F I G. 1A
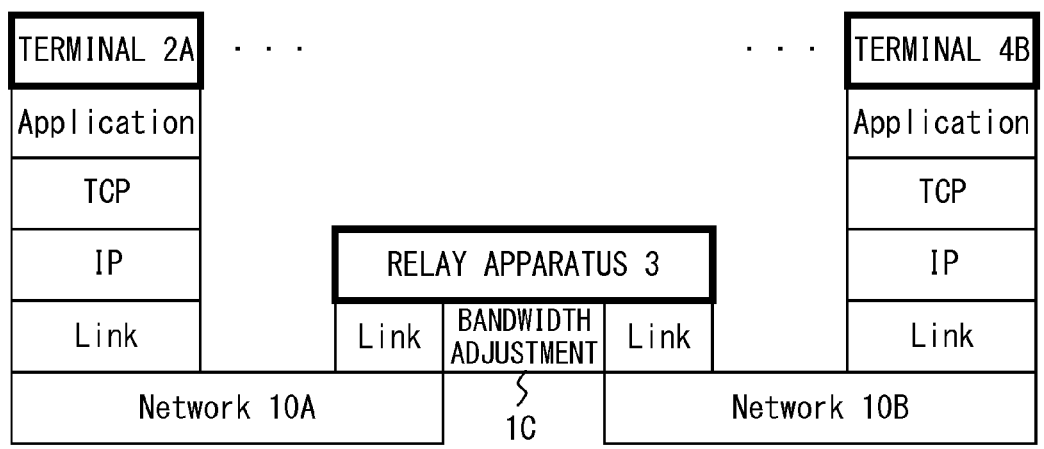
F I G. 1B

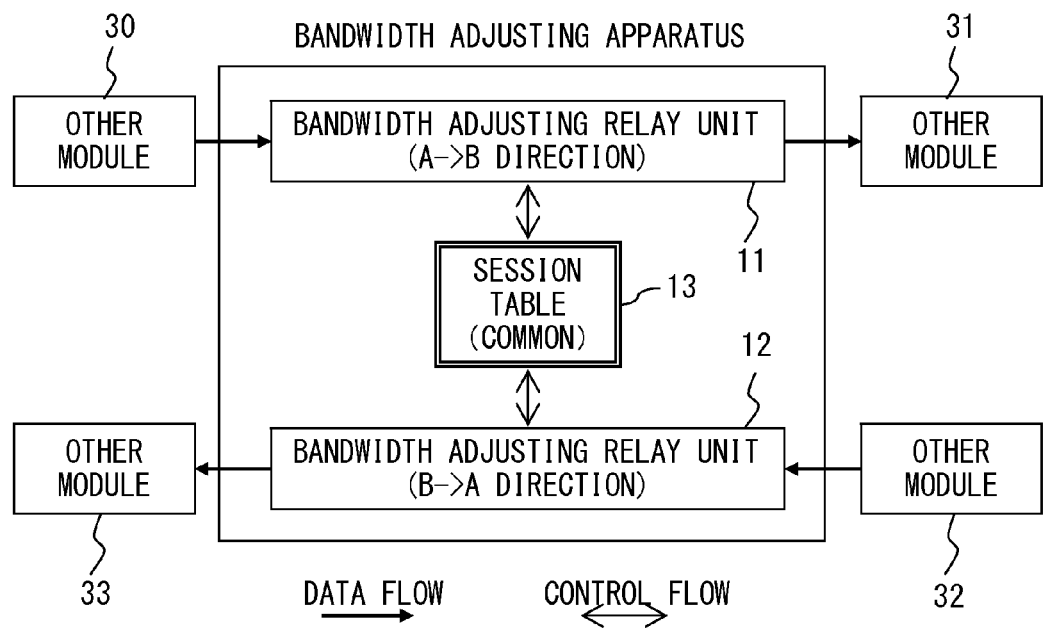
F I G. 2

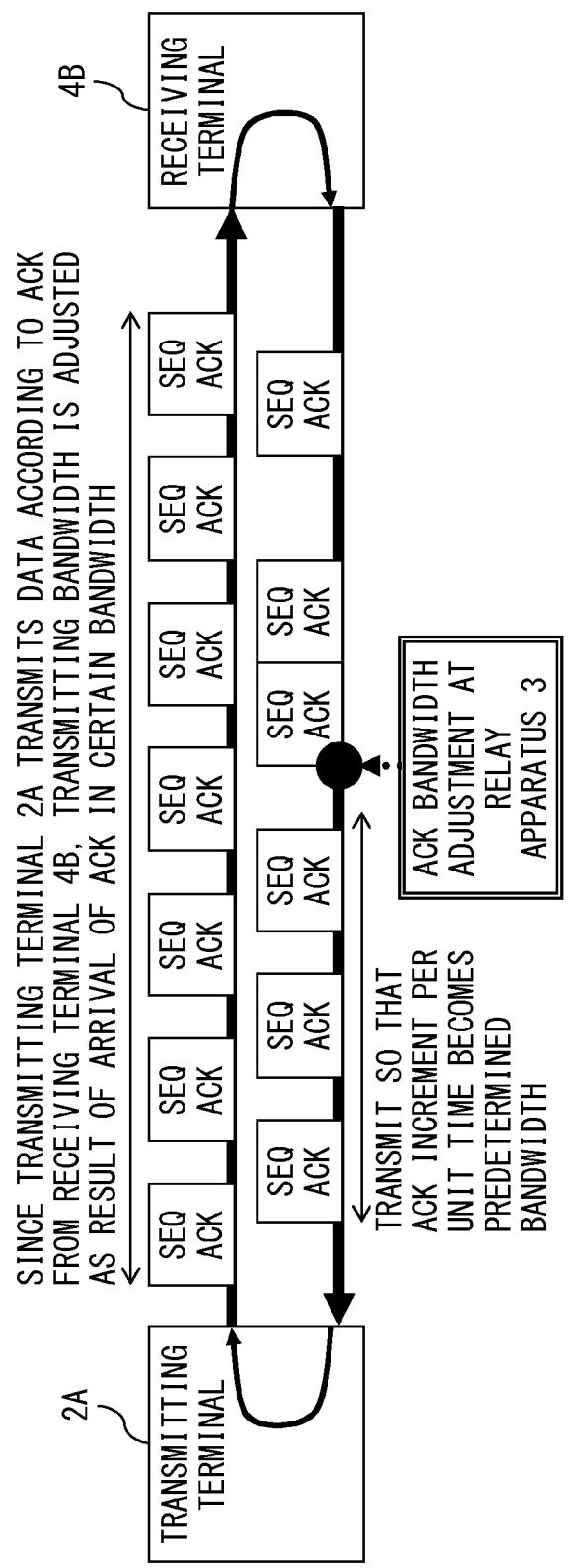
F I G. 7

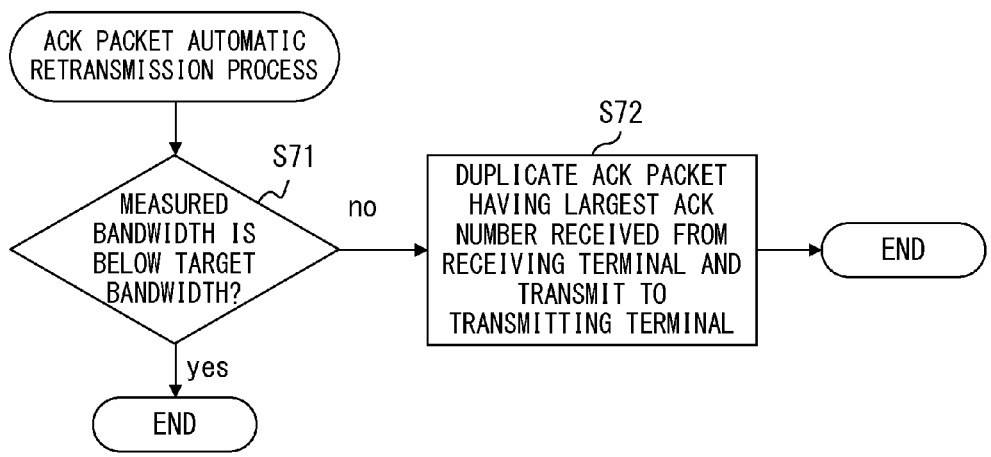
F I G. 20

| INDEX | SESSION TABLE DATA |
|---|---|
| 0 | SESSION INFORMATION 0 |
| 1 | SESSION INFORMATION 1 |
| ... | ... |
| 1023 | SESSION INFORMATION 1023 |

F I G. 2 9

| DATA | DATA AMOUNT | DESCRIPTION | |
|---|---|---|---|
| MANAGING INFORMATION | 4 BYTES | STORE SESSION TABLE MANAGEMENT INFORMATION | D1 |
| DATA INDICATING LOCATION OF SESSION INFORMATION IN OPPOSITE DIRECTION | 4 BYTES | DATA INDICATING LOCATION ON SESSION TABLE OF SESSION INFORMATION IN OPPOSITE DIRECTION BELONGING TO THIS SESSION | D2 |
| HASH KEY CODE | 4 BYTES | HASH KEY CODE CALCULATED FROM PAIR OF IP ADDRESS AND PORT | D3 |
| TRANSMITTING IP ADDRESS | 4 BYTES | 16 BYTES FOR IPv6 | |
| RECEIVING IP ADDRESS | 4 BYTES | 16 BYTES FOR IPv6 | |
| TRANSMITTING PORT NUMBER | 2 BYTES | TCP PORT NUMBER | |
| RECEIVING PORT NUMBER | 2 BYTES | TCP PORT NUMBER | |
| SESSION START TIME | 4 BYTES | TIME AT WHICH SESSION IS REGISTERED TO SESSION TABLE | D4-1 |
| DATA PACKET RELAY TIME | 4 BYTES | TIME AT WHICH DATA PACKET WAS LAST RELAYED | |
| UNIT TIME | 4 BYTES | INTERNAL TIME REPRESENTING UNIT TIME | D5 |
| MEASURED DATA AMOUNT PER UNIT TIME | 4 BYTES | AMOUNT OF DATA RELAYED PER UNIT TIME | D6 |
| MAXIMUM MEASURED DATA AMOUNT PER UNIT TIME | 4 BYTES | MAXIMUM VALUE OF AMOUNT OF DATA RELAYED PER UNIT TIME | |
| MINIMUM MEASURED DATA AMOUNT PER UNIT TIME | 4 BYTES | MINIMUM VALUE OF AMOUNT OF DATA RELAYED PER UNIT TIME | |
| MEASURED ACK AMOUNT PER UNIT TIME | 4 BYTES | INCREMENT OF ACK NUMBER RELAYED PER UNIT TIME | |
| MAXIMUM MEASURED ACK AMOUNT PER UNIT TIME | 4 BYTES | MAXIMUM AMOUNT OF INCREMENT OF ACK NUMBER RELAYED PER UNIT TIME | |
| MINIMUM MEASURED ACK AMOUNT PER UNIT TIME | 4 BYTES | MINIMUM AMOUNT OF INCREMENT OF ACK NUMBER RELAYED PER UNIT TIME | |
| TRANSFERABLE DATA AMOUNT PER UNIT TIME | 4 BYTES | AMOUNT OF DATA THAT MAY BE TRANSFERRED PER UNIT TIME (SET VALUE) | D7 |
| TRANSFERABLE ACK AMOUNT PER UNIT TIME | 4 BYTES | AMOUNT OF ACK THAT MAY BE TRANSFERRED PER UNIT TIME (SET VALUE) | |
| RELAY DATA AMOUNT PER UNIT TIME | 4 BYTES | AMOUNT OF DATA RELAYED PER UNIT TIME | D8 |
| MAXIMUM RELAY DATA AMOUNT PER UNIT TIME | 4 BYTES | MAXIMUM VALUE OF AMOUNT OF DATA RELAYED PER UNIT TIME | |
| MINIMUM RELAY DATA AMOUNT PER UNIT TIME | 4 BYTES | MINIMUM VALUE OF AMOUNT OF DATA RELAYED PER UNIT TIME | |
| RELAY ACK AMOUNT PER UNIT TIME | 4 BYTES | INCREMENT OF ACK NUMBER RELAYED PER UNIT TIME | |
| MAXIMUM RELAY ACK AMOUNT PER UNIT TIME | 4 BYTES | MAXIMUM AMOUNT OF INCREMENT OF ACK NUMBER RELAYED PER UNIT TIME | |
| MINIMUM RELAY ACK AMOUNT PER UNIT TIME | 4 BYTES | MINIMUM AMOUNT OF INCREMENT OF ACK NUMBER RELAYED PER UNIT TIME | |
| LARGEST SEQ NUMBER AMONG BUFFERED DATA PACKET | 4 BYTES | LARGEST SEQ NUMBER AMONG BUFFERED DATA PACKETS | D9 |
| SMALLEST SEQ NUMBER AMONG BUFFERED DATA PACKET | 4 BYTES | SMALLEST SEQ NUMBER AMONG BUFFERED DATA PACKETS | |
| DATA PACKET QUEUE | 16 BYTES | DATA PACKET QUEUE STRUCTURE | D11 |
| ACK PACKET RELAY TIME | 4 BYTES | TIME AT WHICH ACK PACKET WAS LAST RELAYED | D4-2 |
| LARGEST ACK NUMBER OF RELATED ACK PACKETS | 4 BYTES | LARGEST ACK NUMBER AMONG RELAYED ACK PACKETS ACK PACKET WHOSE ACK NUMBER IS LARGEST IS BUFFERED | D10 |
| ACK PACKET QUEUE | 4 BYTES | PACKET BUFFER (BUFFER ONE) | D11 |

F I G. 30

COMMUNICATION APPARATUS AND COMMUNICATION METHOD

RELATED APPLICATIONS

This application is a U.S. National Stage Filing under 35 U.S.C. §371 of International Application No. PCT/JP2010/059221, filed on May 31, 2010, and published as WO 2011/151884 A1 on Dec. 8, 2011, which application and publication are incorporated herein by reference in their entirety.

TECHNICAL FIELD

The present invention relates to a technique to control the communication bandwidth in communication conducted via a network between a transmitting apparatus and a receiving apparatus.

BACKGROUND ART

With recent progress in the network technology, traffic carried in a network such as the Internet has kept increasing. The IP (Internet Protocol) used in the Internet and the like plays a role to transit a packet to the counterpart apparatus. The communication realized by the IP is "communication without reliability". That is, the IP does not assure the arrival and the order of arrival of data.

The TCP (Transmission Control Protocol) is used to realize "communication with reliability". Hereinafter, it is assumed that the "communication with reliability" refers to communication in which transmitted data is forwarded without excess or deficiency in the order of transmission.

While the TCP currently occupies a large part of traffic, the actual condition is that its performance is unstable and variable. In order to provide multi-media distribution services and the like of video, it is necessary to stabilize the TCP performance.

The TCP bandwidth control technique is one of known techniques related to the TCP performance. The TCP bandwidth control technique relates to controlling the traffic to a predetermined amount or less, which is a technique in which, basically, the congestion of the network is avoided by assigning priority according to the type of traffic and discarding traffic with a low degree of priority.

DISCLOSURE OF INVENTION

According to the conventional art, the TCP has a function to adjust the data transmission speed by flow control at the time of congestion. The function operates when there is congestion, and as long as transmitted data reaches the terminal apparatus of the receiving side without being discarded, tries to increase the performance. That is, while it is capable of increasing the performance according to the condition of the communication, control such as suppressing the performance low to an appropriate range cannot be performed.

First, the communication performance that a certain communication requires is performance A that is determined by the application or the system administrator. Then, given performance A as the target, there is performance B that is determined dynamically according to the actual communication condition. In view of the increasing trend of traffic in recent years, it is necessary to control the bandwidth, for example, so as to lower the performance B when the actual communication condition is good and the performance B exceeds the performance A, and to increase the performance B when it is necessary to increase the performance B.

An objective of the present invention is to provide a technique with which a bandwidth adjustment to obtain required performance in consideration of the balance between the bandwidth adjustment and increasing performance.

In order to solve the problem above, a communication apparatus disclosed herein is configured to be a communication apparatus that controls a bandwidth of communication when a transmitting apparatus and a receiving apparatus perform communication via a network, having a measuring unit configured to measure a bandwidth for communication of at least one direction of two directions from the transmitting apparatus to the receiving apparatus and from the receiving apparatus to the transmitting apparatus; a storing unit configured to store information regarding bandwidth adjustment including a target bandwidth indicating a bandwidth required for communication; and an adjusting unit configured to read out, from the storing unit, the target bandwidth of a direction for which the bandwidth was measured, and performs throttling or enhancing of the bandwidth by adjusting the transmission interval of packets based on a comparison of the bandwidth measured at the measuring unit and the read out target bandwidth.

According to the communication apparatus disclosed herein, communication stabilizes, and it becomes possible to effectively suppress the retransmission of packets.

BRIEF DESCRIPTION OF DRAWINGS

FIG. 1 is an overall view presenting a communication system having a bandwidth adjusting apparatus according to the embodiment.

FIG. 2 is a configuration diagram of a bandwidth adjusting apparatus according to the embodiment.

FIG. 7 is a diagram illustrating a bandwidth throttling method for the ACK packet transmitting direction.

FIG. 20 is a flowchart presenting a proxy retransmission process of an ACK packet.

FIG. 29 is a diagram presenting a configuration example of a session table.

FIG. 30 is a diagram presenting a configuration example of session table data.

BEST MODE OF CARRYING OUT THE INVENTION

Figure 3:
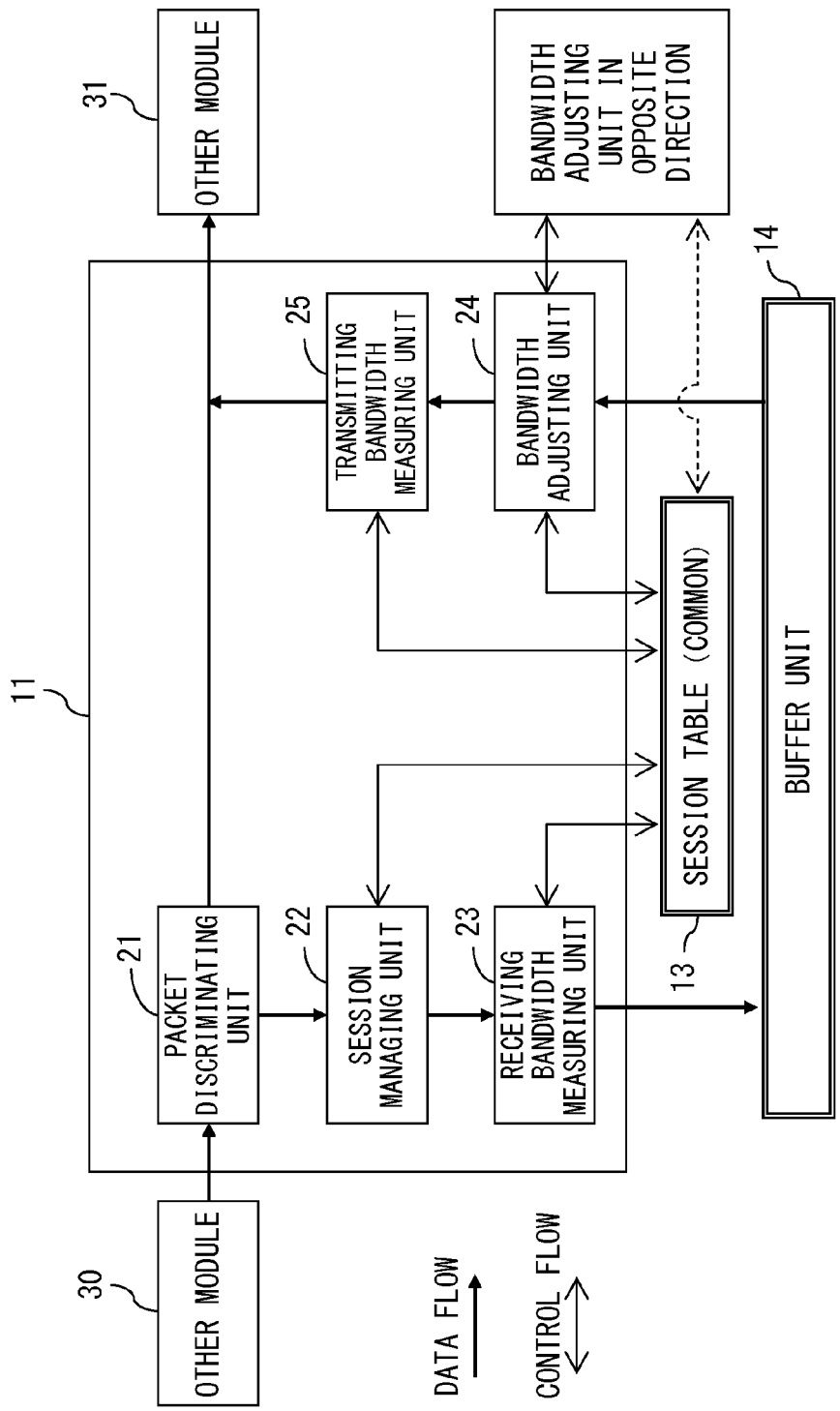
FIG. 3 is a configuration diagram of a bandwidth adjusting relay unit.

Hereinafter, an embodiment of the present invention are described in detail with reference to drawings.

[Configuration]

FIG. 1 is an overall view presenting a communication system having a bandwidth adjusting apparatus according to the present embodiment. In the communication system presented in FIG. 1(a), two units of a terminal apparatus 2A and a terminal apparatus (hereinafter, terminal) 4B are connected to each other via a network 10, and perform communication such as video image distribution (moving image distribution) and the like using the TCP communication for example. Examples of the network 10 include, for example, a wired access network such as ADSL (Asymmetric Digital Subscriber Line), FTTx (Fiber To The x) and the like, and a wireless access network such as WiMAX (Worldwide Interoperability for Microwave Access) and the like. The terminals 2A, 4B consist of, for example, a network device for home or a small size office, a personal computer, a mobile terminal, a network connection adaptor, and the like.

Each of the terminals 2A, 4B has bandwidth adjusting apparatuses 1A, 1B and the bandwidth adjusting apparatuses 1A, 1B adjust the bandwidth of a packet that the apparatus itself transmits/receives to an appropriate value according to the communication. In the description below, symbol "A" is assigned to apparatuses on the data transmitting side, and symbol "B" is assigned to apparatuses on the data receiving side.

The bandwidth adjusting apparatuses 1A, 1B may be positioned in any place as long as it is a position from which the TCP/IP packet may be observed. FIG. 1(a) presents a configuration in which the bandwidth adjusting apparatuses 1A, 1B are provided in the transmitting terminal and the receiving terminal.

FIG. 1(b) is a system configuration diagram in a case in which the bandwidth adjusting apparatus 1 according to the present embodiment is incorporated in an apparatus other than the terminal. In the example presented in FIG. 1(b), a bandwidth adjusting apparatus 1C is incorporated in a relay apparatus 3, and adjusts the bandwidth of a packet transmitted/received between the terminal 2A and the terminal 4B to an appropriate value for the communication.

Here, the relay apparatus 3 refers to a network device which recognizes the TCP partly or thoroughly and provides functions related to the TCP. The relay apparatus 3 includes not only a router, a bridge and the like but also, for example, a proxy server, a load balancer, a traffic shaper and a WAN (Wide Area Network) optimizing apparatus and the like.

Meanwhile, in FIG. 1(a) and FIG. 1(b), in order to explain the setting position of the bandwidth adjusting apparatus according to the present embodiment, only the bandwidth terminals 2A, 4B and the relay apparatus 3 are presented while simplifying the configuration of the communication system.

Hereinafter, with the configuration of FIG. 1(b), that is, the case in which the bandwidth adjusting apparatus 1 is installed in the relay apparatus 3 positioned in the network 10 between the transmitting terminal 2A and the receiving terminal 4B as an example, a method in which the bandwidth adjusting apparatus 1 adjusts the bandwidth between the transmitting terminal 2A and the receiving terminal 4B is explained specifically.

FIG. 2 is a configuration diagram of the bandwidth adjusting apparatus 1 according to the present embodiment. The bandwidth adjusting apparatus 1 illustrated in FIG. 2 has two bandwidth adjusting relay units 11, 12 and a session table 13. The bandwidth adjusting relay units 11, 12 receive a packet from "other modules 30, 32" and passes the packet to "other modules 31, 33" respectively.

The "other modules 31, 33" illustrated in FIG. 2 are network device drivers and other protocol stacks provided in the relay apparatus 3, each of which processes packets including the TCP/IP packet.

The bandwidth adjusting relay units 11, 12 in the bandwidth adjusting apparatus 1 receives and passes packets from/to the other modules 30-33. If the received packet is the TCP packet, the bandwidth adjusting relay units 11, 12 perform bandwidth adjustment for the direction from the transmitting terminal 2A to the receiving terminal 4B and the direction from the receiving terminal 4B to the transmitting terminal 2A respectively. Meanwhile, in FIG. 2 and FIG. 3 that is to be explained next, each transmission direction is described as the "A->B direction" and the "B->A direction".

The session table 13 stores information necessary for when the adjusting relay units 11, 12 perform the bandwidth adjustment. Details of the session table 13 are to be explained later with reference to FIG. 29 and FIG. 30.

When packets in the both directions from the transmitting terminal 2A to the receiving terminal 4B and from the receiving terminal 4B to the transmitting terminal 2A pass through the bandwidth adjusting apparatus 1, the bandwidth adjusting apparatus 1 performs the bandwidth adjustment to the both communication directions. When only packets in one direction pass through the bandwidth adjusting apparatus 1, the bandwidth adjusting apparatus 1 performs the bandwidth adjustment in the bandwidth adjusting relay unit on the side through which the packet is passing, of the bandwidth adjusting relay unit 11, 12, and stores necessary information in the session table 13. The bandwidth adjusting relay unit of the other side may perform the bandwidth adjustment with reference to the session table 13.

FIG. 3 is a configuration diagram of the bandwidth adjusting relay apparatus. The bandwidth adjusting relay apparatus 11 illustrated in FIG. 3 includes a packet discriminating unit 21, a session managing unit 22, a receiving bandwidth measuring unit 23, a bandwidth adjusting unit 24 and a transmitting bandwidth measuring unit 25.

Meanwhile, while only the configuration of the bandwidth adjusting relay unit 11 in the A->B direction is illustrated in FIG. 3, the configuration of the bandwidth adjusting relay unit 12 in the B->A direction is similar to the configuration of the bandwidth adjusting relay unit 11 illustrated in FIG. 3, and the bandwidth adjusting relay units 11, 12 share the session table 13 and the buffer unit 14.

The packet discriminating unit 21 determines whether the packet received from the other module 30 is a packet to be the target of the bandwidth adjustment or not. Specifically, whether or not it is TCP packet is determined.

The session managing unit 22 performs the management of the TCP session when the packet discriminating unit 21 determines that the packet is the target of the bandwidth adjustment. The session managing unit 22 performs processes such as to store information necessary for the management of the TCP session, and to take out necessary information from the session table 13.

The receiving bandwidth measuring unit 23 measures the receiving bandwidth of the packet being the control target of the session managing unit 22. The receiving bandwidth measuring unit 23 stores the measured receiving bandwidth in the session table 13, and when necessary, stores the received packet in the buffer unit 14.

The bandwidth adjusting unit 24 adjusts the bandwidth based on information such as the measured bandwidth and the like stored in the session table 13. Specifically, the bandwidth adjustment is performed by making the transmission interval of packets longer or shorter according to the magnitude correlation between the target bandwidth indicating the bandwidth required for the communication and the actually measured bandwidth. The adjusting method of the transmission interval of packets is to be explained in detail with reference to drawings.

The transmitting bandwidth measuring unit 25 measures the bandwidth of the packet forwarded to the other module 31 according to the bandwidth adjusting unit 24 and the packet forwarded to the other module 31 from the packet discriminating unit 21, and stores the measurement result in the setting table 13.

Meanwhile, differing from the description "transmission" "reception" in the explanation of the operation in the communication system, in the explanation of the receiving bandwidth measuring unit 23 and transmitting bandwidth measuring unit 25, the description "transmission" "reception" is anchored to the bandwidth adjusting apparatus 1. That is, since the receiving bandwidth measuring unit 23 handles the packet that the bandwidth adjusting apparatus 1 "receives" from the other module 30, and the transmitting bandwidth measuring unit 25 handles the packet that the bandwidth adjusting apparatus 1 "transmits" to the other module 31, such description is made.

The bandwidth adjusting unit 24 transmits/receives information related to the bandwidth adjustment to/from the bandwidth adjusting unit of the bandwidth adjusting relay unit 12 in the opposite direction. As described above, even in a case in which the bandwidth adjusting relay unit of one side is not transmitting/receiving the TCP packet and is not performing the bandwidth measurement, the bandwidth adjustment is performed based on information that the bandwidth adjusting relay unit of the other side stored in the session table 13 and control information received from the other bandwidth adjusting unit.

As illustrated in FIG. 1-FIG. 3, the bandwidth adjusting apparatus 1 monitors the TCP communication and performs the bandwidth adjustment. For example, many of general server applications such as the Apache HTTP Server, Lighttpd, Squid cache, BitTorrent, and the like, have a function (Bandwidth Throttling) to adjust the transmitting bandwidth for each TCP communication. However, bandwidth adjustment with a high accuracy cannot be expected by such a known bandwidth adjustment technique.

That is, even if the bandwidth adjustment is performed by the application, there is a possibility for burst traffic in the transport layer (such as the TCP), the network layer (such as the IP), the device driver, and the like, depending on the scheduling of the operating system. In addition, when the bandwidth adjustment is performed by the application, the situation from the TCP layer to the network layer cannot be understood accurately, and the application cannot recognize the discrepancy between the communication performance expected by the application and the actual communication performance, and cannot perform the bandwidth adjustment according to the actual communication. For example, even for the data to be the target of the bandwidth adjustment, the situation such as the amount of data actually transmitted/received/retransmitted cannot be recognized on an real time basis. For this reason, the application only performs the bandwidth adjustment so as to make it to "the communication performance required logically for the communication", and cannot perform the bandwidth adjustment based on the actuality.

On the other hand, the bandwidth adjusting apparatus 1 according to the present embodiment is capable of monitoring the actual TCP communication and performing the bandwidth adjustment based on it. Compared with the bandwidth adjustment by the application, the bandwidth adjustment with more accuracy may be performed.

[Direction of Communication]

The transmitting terminal 2A and the receiving terminal 4B respectively transmit a data packet and an ACK packet to the counterpart terminal. In the bandwidth adjusting apparatus 1 in the configuration illustrated in FIG. 2 and FIG. 3, the bandwidth adjusting relay units 11, 12 respectively monitors the communication in the A->B direction and in the B->A direction. For this reason, the bandwidth adjusting apparatus 1 provided on the transmission path may perform the bandwidth transmission not only in the case in which both packets of the data packet and the ACK packet are forwarded, but also in the case in which either one of the data packet or the ACK packet. For example, even in a case in which the relay apparatus 3 having the bandwidth adjusting apparatus 1 relays only the data packet in the A->B direction and the ACK packet goes through another route, only the bandwidth adjusting relay unit 11 of the bandwidth adjusting apparatus 1 monitors the data packet and performs the bandwidth adjustment.

[Bandwidth Measurement]

The method in which the bandwidth adjusting apparatus 1 according to the present embodiment monitors the data packet and the ACK packet and measures the communication bandwidth is explained with reference to FIG. 4 and FIG. 5 respectively.

Figure 4:
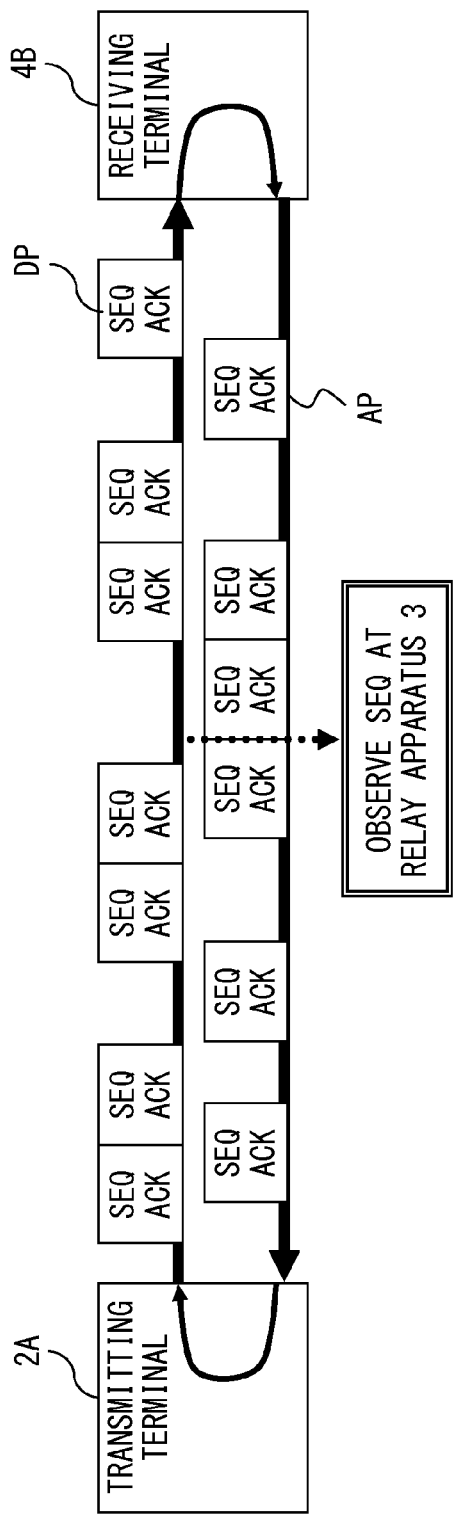
FIG. 4 is a diagram illustrating a method in which the bandwidth adjusting relay unit of the bandwidth adjusting apparatus according to the embodiment measures the bandwidth of a data packet.
Figure 5:
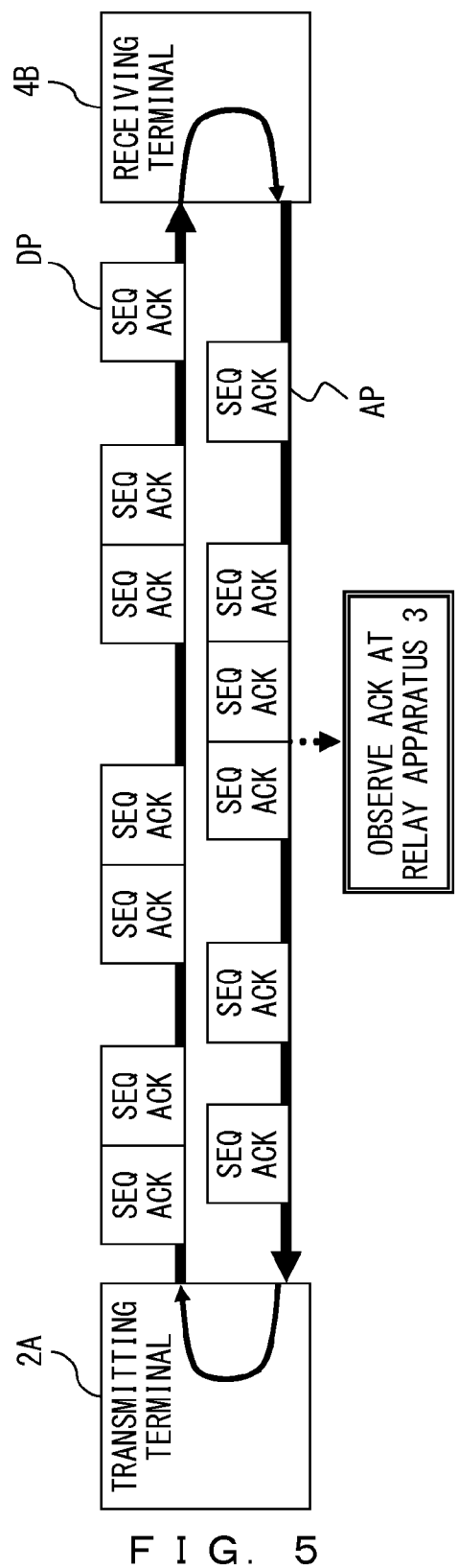
FIG. 5 is a diagram illustrating a method in which the bandwidth adjusting relay unit of the bandwidth adjusting apparatus according to the embodiment measures the bandwidth of an ACK packet.

FIG. 4 is a diagram illustrating a method in which the bandwidth adjusting relay unit 11 of the bandwidth adjusting apparatus 1 according to the present embodiment measures the bandwidth of the data packet, and FIG. 5 is a diagram illustrating a method in which the bandwidth adjusting relay unit 12 of the bandwidth adjusting apparatus 1 measures the bandwidth of the ACK packet. The upper part of FIG. 4 and FIG. 5 illustrates the flow of a data packet DP, and the lower part illustrates the flow of an ACK packet AP, and the same applies below.

The examples in FIG. 4 and FIG. 5 illustrates the case in which the bandwidth adjusting apparatus 1 is incorporated into the relay apparatus 3, and the same applies to the explanation below. Hereinafter, the explanation is made with the relay apparatus 3 as a network device as an example, but this is not a limitation. For example, a unit in the operating system to give/receive the TCP/IP may also fulfill the similar function, and various processes explained below may be incorporated as software and hardware.

The receiving bandwidth measuring unit 23 in the bandwidth adjusting apparatus 1 of the relay apparatus 3 monitors the data packet DP that the transmitting terminal 2A sends to the receiving terminal 4B and the ACK packet AP that the receiving terminal 4B that received the data packet DP sends back to the transmitting terminal 2A, and measures the communication bandwidth.

In the case of measuring the communication bandwidth is measured by the data packet, as illustrated in FIG. 4, the transmission bandwidth at the setting position of the relay apparatus 3 in the communication system is measured by observing the sequence number (SEQ in FIG. 4) included in the data packet and the data length of the packet and obtaining the accumulated value of the data length.

In the case of measuring the communication bandwidth is measured by the ACK packet, as illustrated in FIG. 5, the reception bandwidth at the setting position of the relay apparatus 3 in the communication system is measured by counting the increment of the ACK, based on the ACK number (ACK in FIG. 5) included in the ACK packet.

The ACK packet has a smaller data length compared with the data packet, and the data length does not differ significantly for each data like the data packet. For this reason, only the ACK number is observed, and the reception bandwidth is measured by accumulating the increment of the ACK packets that the relay apparatus 3 relays within a predetermined period.

[Bandwidth Adjustment]

Using the communication bandwidth measured in the methods illustrated in FIG. 4 and FIG. 5, the bandwidth adjusting unit 24 of the bandwidth adjusting apparatus 1 performs the bandwidth adjustment by adjusting the time interval to transmit packets (the data packet DP and the ACK packet AP) from the relay apparatus 3. The bandwidth adjusting unit 24 determines whether a process to extend the time interval of the packet transmission (to make the time interval longer) or a process to shorten the time interval of the packet transmission (to make the time interval shorter) should be performed, according to the communication bandwidth measured by the method as described above in the explanation of FIG. 3.

Hereinafter, to perform the bandwidth adjustment so as to make the time interval of the packet transmission longer is defined to as the "throttle of the bandwidth". And to perform the bandwidth adjustment so as to make the time interval of the packet transmission shorter is defined to as the "enhance of the bandwidth". First, the throttling method of the bandwidth by the bandwidth adjusting apparatus 1 according to the present embodiment is explained.

Figure 6:
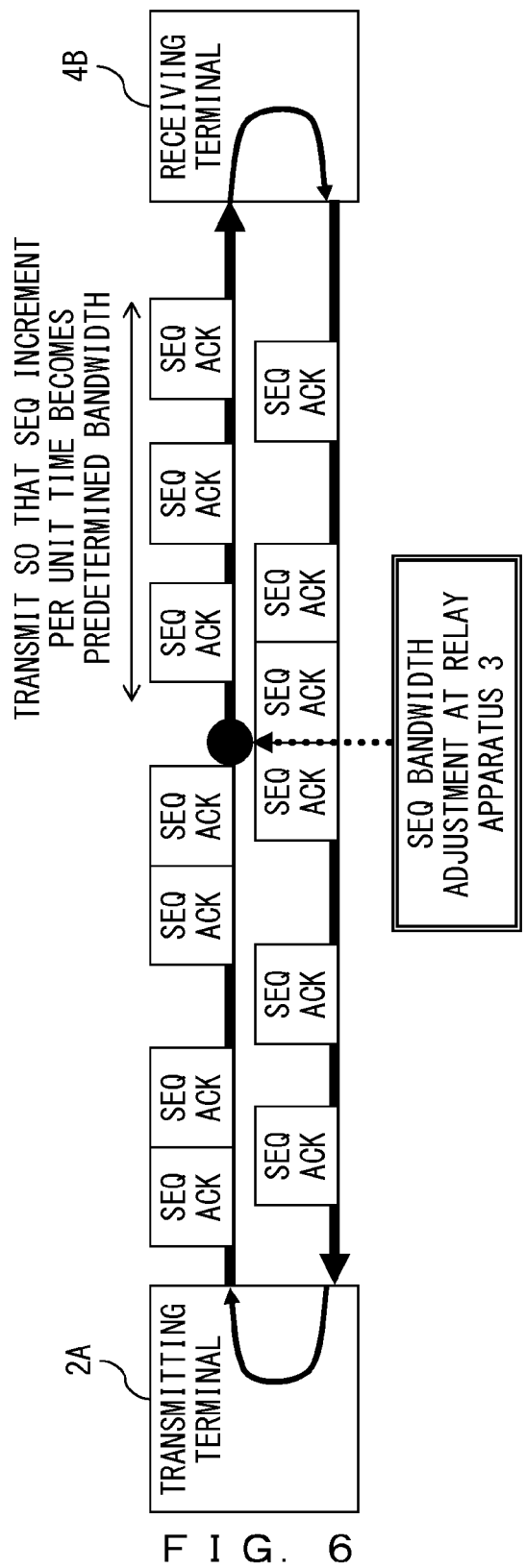
FIG. 6 is a diagram illustrating a bandwidth throttling method for the data packet transmitting direction.

FIG. 6 is a diagram illustrating a bandwidth throttling method for the data packet transmitting direction, and FIG. 7 is a diagram illustrating a bandwidth throttling method for the ACK packet transmitting direction.

The bandwidth adjusting unit 24 in the bandwidth adjusting apparatus 1 of the relay apparatus 3 controls the communication and throttles the bandwidth when the communication bandwidth measured at the receiving bandwidth measuring unit 23 exceeds the target bandwidth indicating the bandwidth required for the communication. The throttling methods of the bandwidth include a method to control the transmission interval of the data packets and a method to control the transmission interval of ACK packets.

For example, regarding the control of the transmission interval of the data packets, as illustrated in FIG. 6, the bandwidth adjusting unit 24 of the bandwidth adjusting apparatus 1 performs control so as to throttle the bandwidth of the data packet that the transmitting terminal 2A transmits. Specifically, the forwarding interval of the data packets is controlled so that, with respect to the target bandwidth, the increment of the sequence number per unit time is controlled to be within a predetermined range. Accordingly, even when the transmitting terminal 2A produces burst traffic, the data packet may be delivered to the receiving terminal 4B in the predetermined bandwidth.

Meanwhile, regarding the control of the transmission interval of the ACK packets, as illustrated in FIG. 7, the bandwidth adjusting unit 24 of the bandwidth adjusting apparatus 1 performs control so as to throttle the bandwidth of the ACK packet that the transmitting terminal 4A transmits. Specifically, the forwarding interval of the ACK packets is controlled so that, with respect to the target bandwidth, the increment of the ACK number per unit time is within a predetermined range.

Generally, the transmitting terminal 2A transmits the data packets corresponding to the windows size as burst traffic in the early stage of the TCP communication, but for subsequent data packet transmission, the transmitting terminal 2A transmits the data packets addressed to the receiving terminal 4B in the bandwidth according to the receiving bandwidth of the ACK packet. For this reason, by the control of the transmission interval of the ACK packets as described above, the transmitting terminal 2A is to transmit the data packets according to the increment of the received ACK packets, and the bandwidth to for the data packet transmitting direction may be adjusted accordingly.

Next, the enhancing method of the bandwidth by the bandwidth adjusting apparatus 1 according to the present embodiment is explained.

Figure 8:
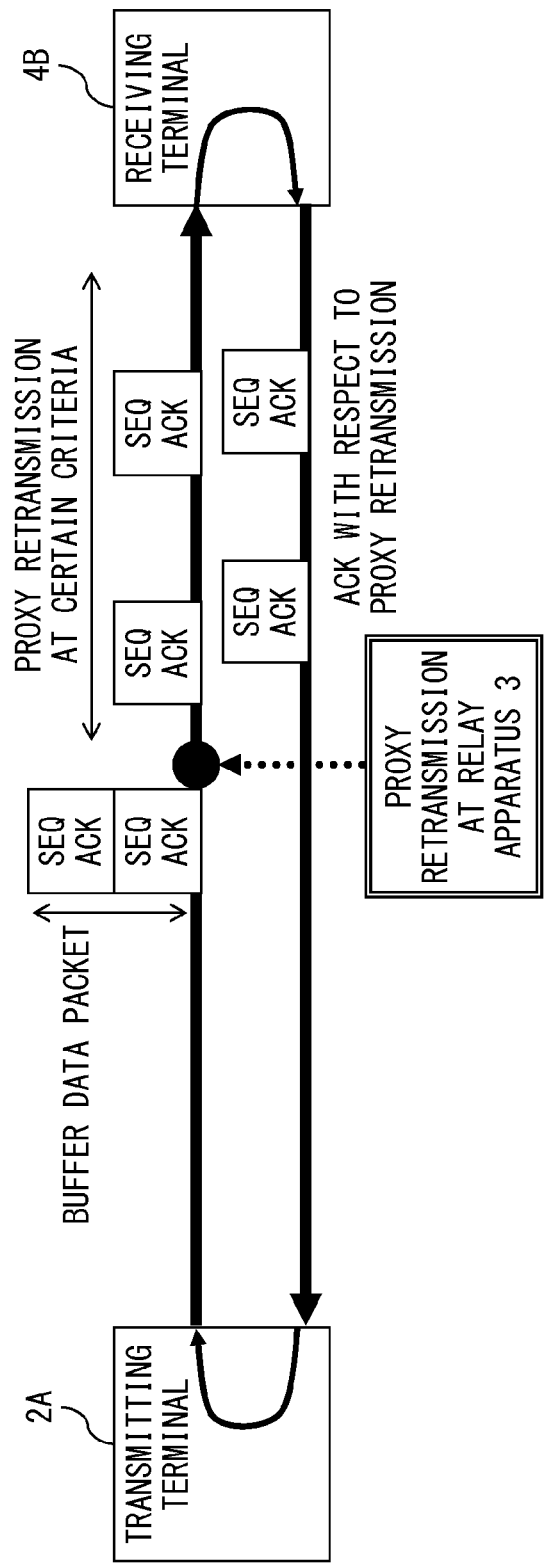
FIG. 8 is a diagram illustrating a bandwidth enhancing method for the data packet transmitting direction.
Figure 9:
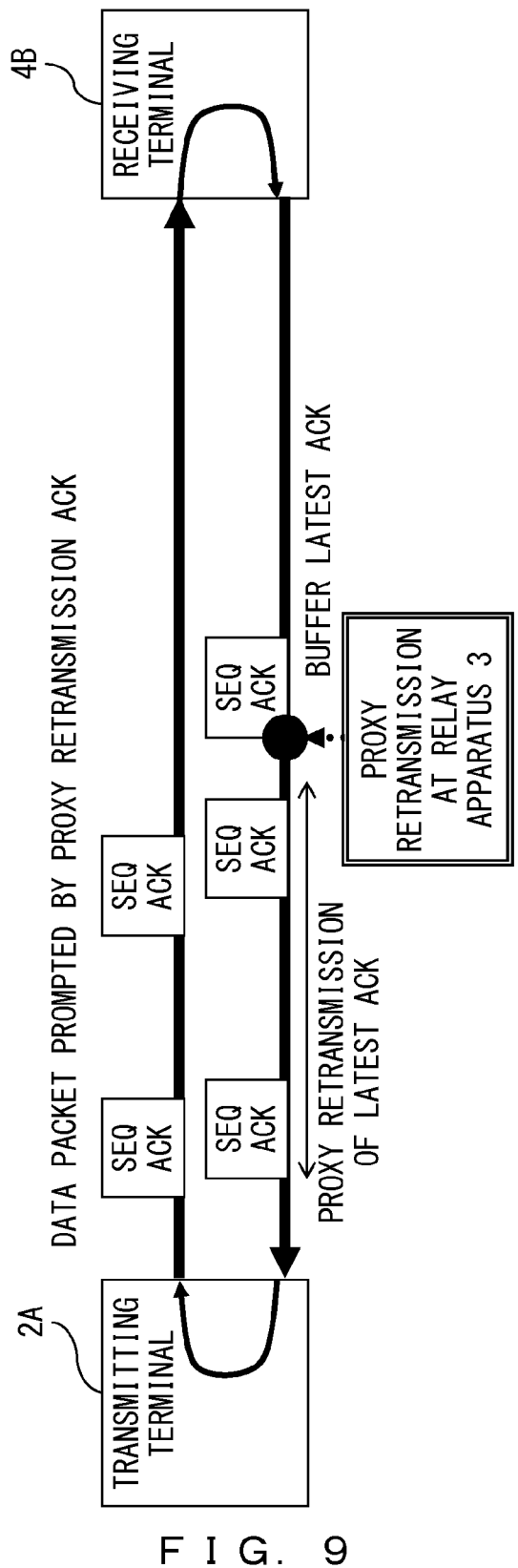
FIG. 9 is a diagram illustrating a bandwidth enhancing method for the ACK packet transmitting direction.

FIG. 8 is a diagram illustrating the enhancing method of the bandwidth for the data packet transmitting direction, and FIG. 9 is a diagram illustrating the enhancing method of the bandwidth for the ACK packet transmitting direction.

The bandwidth adjusting unit 24 in the bandwidth adjusting apparatus 1 of the relay apparatus 3 performs control to enhance the bandwidth when the communication bandwidth measured at the receiving bandwidth measuring unit 23 is below the target bandwidth mentioned above. In a similar manner to the throttling methods of the bandwidth, the enhancing methods of the bandwidth include a method to control the transmission interval of the data packets and a method to control the transmission interval of the ACK packets.

Regarding the control of the transmitting interval of the data packet, as illustrated in FIG. 8, the bandwidth adjusting unit 24 of the bandwidth adjusting apparatus 1 buffers the data packet received from the transmitting terminal 2A in the buffer unit 14, and transmits the buffered data packet to the receiving terminal 4B at least once. The retransmission of the buffered data packet may be performed a plurality of times according to the target bandwidth.

Hereinafter, the bandwidth adjusting apparatus 1 transmitting the buffered data packet to the receiving terminal 4B is referred to as the "proxy retransmission of the data packet". In the explanation below, it is assumed that in contrast to the transmitting terminal 2A retransmitting the data packet by the retransmitting function of TCP, the bandwidth adjusting apparatus 1 retransmitting the data packet is described in this way.

The receiving terminal 4B that received the data packet sent by proxy retransmission refers to the sequence number included in the data packet, and when it is recognized as an unreceived data packet, sends back an ACK packet corresponding to the data packet sent by proxy transmission. Thus, by the enhance process of the bandwidth, that is, by the proxy retransmission of the data packet, the ACK packet corresponding to the data packet that has been discarded between the relay apparatus 3 and the receiving terminal 4B is send back from the receiving terminal 4B.

Furthermore, one of possible reasons that the measured bandwidth in the A->B direction (the transmitting bandwidth for the actual data packet) falls below the target bandwidth is that the transmission of the data packets from the transmitting terminal 2A is delayed, as the ACK packets are not reaching the transmitting terminal 2A sufficiently. According to the above enhancing process of the bandwidth, the transmission of the data packet by the transmitting terminal 2A is enhanced because the transmitting terminal 2A transmits the data packet that should be transmitted next, upon receiving the ACK packet corresponding to a data packet sent by proxy retransmission.

Thus, by performing proxy retransmission of the data packet when the measured bandwidth is below the target bandwidth, the sending back of the ACK from the receiving terminal 4B and the transmission of the data packet from the transmitting terminal 2A are enhanced, and an effect to enhance the delayed communication is obtained.

Meanwhile, if the receiving terminal 4B has already received the data packet sent by the proxy retransmission, the receiving terminal 4B discards the data packet sent by the proxy retransmission, so the proxy retransmission process does not negatively affect the TCP communication.

In addition, according to the conventional TCP improvement system, in order to enhance the transmitting terminal to transmit the data packet of the next sequence number, the transmitting bandwidth is enhanced with the relay apparatus transmitting a proxy ACK packet. This is a TCP relay technique known as "Splitting TCP" and "TCP Spoofing". These conventional TCP relay techniques solve problems such as the poor scalability of the TCP relay apparatus in the ALG (Application Level Gateway) system and the difficulty in executing complicated processes by TCP Splicing.

However, while detailed explanation is omitted since these are publicly known techniques, in Splitting TCP and TCP Spoofing, the relay apparatus once terminates the TCP communications from the transmitting terminal and performs new TCP communication to the receiving terminal. According to this, supposedly, assuming that the data packet corresponding to the ACK packet that the relay apparatus transmitted as a proxy (for example, a data packet of "sequence number=10+ 1=11" that the transmitting terminal transmits in response to the ACK packet of "ACK number=10") has not been received at the receiving terminal, the proxy ACK packet (ACK number=10) is false. There is a possibility that, since the transmitting terminal that received a false proxy ACK packet discards the previous data (data up to sequence number=10), if the relay apparatus stops operation or is removed from the network, the discarded data cannot be recovered again.

By contrast, according to the bandwidth adjusting apparatus 1 according to the present embodiment, there is an advantage that even when the data packet is sent by proxy retransmission, the transmitting terminal 2A does not discard the data packet sent by proxy retransmission, and even if the relay apparatus 3 is removed from the network, data is not to be lost.

Regarding the control of the transmitting interval of the ACK packet, as illustrated in FIG. 9, the bandwidth adjusting unit 24 of the bandwidth adjusting apparatus 1 buffers the ACK in the buffer unit 14, and transmits the buffered ACK packet to the transmitting terminal 2A according to the target bandwidth. The retransmission of the buffered ACK packet may be performed a plurality of times according to the target bandwidth.

Hereinafter, the bandwidth adjusting apparatus 1 transmitting the buffered ACK packet to the transmitting terminal 2A is referred to as the "proxy retransmission of the ACK packet". In the explanation below, it is assumed that in contrast to the receiving terminal 4B retransmitting the ACK packet, the bandwidth adjusting terminal 1 retransmitting the ACK packet is described in this way.

The transmitting terminal 2A that received an ACK packet sent by proxy retransmission has a possibility to transmit a data packet corresponding to the ACK packet. Thus, by performing proxy retransmission of the ACK packet when the measured bandwidth is below the target bandwidth, the transmission of the data packet by the transmitting terminal 2A is enhanced, and an effect to enhance the disrupted communication is obtained.

Incidentally, "Fast Recovery" is one of congestion control techniques for the TCP. According to this technique, if the transmitting terminal 2A receives three same ACK packets successively, the transmitting terminal 2A regards that the discarding of the packet is temporally, and retransmits the data packet without reducing the congestion window size. According to the above proxy retransmission process of the ACK packet, the retransmitting function of the data packet by "Fast Recovery" is enhanced, and accordingly, an effect to enhance the bandwidth of the transmitting terminal 2A may be obtained.

Meanwhile, even if the ACK packet sent by proxy retransmission has already been received at the transmitting terminal 2A, the transmitting terminal 2A processes the redundantly received ACK packet similarly to the conventional manner, so the proxy retransmission of the ACK packet does not negatively affect the TCP communication.

As explained with reference to FIG. 8 and FIG. 9, in enhancing the bandwidth, (the relay apparatus 3 that has) the bandwidth adjusting apparatus 1 retransmits the packet as proxy for the transmitting terminal 2A and the receiving terminal 4B. Since the proxy retransmission by the bandwidth adjusting apparatus 1 is performed earlier than the packet retransmission by the retransmitting function of the TCP, in a case in which the discarding of the packet has occurred in the path and is disrupting the communication, such proxy retransmission makes it possible to recover the normal communication state more quickly.

With reference to FIG. 10-FIG. 13, the method in which the bandwidth adjusting apparatus 1 according to the present embodiment monitors packets transmitted/received between the transmitting terminal 2A and the receiving terminal 4B and performs the bandwidth adjustment of throttling or enhancing the bandwidth is explained with reference to the flowcharts.

Figure 10:
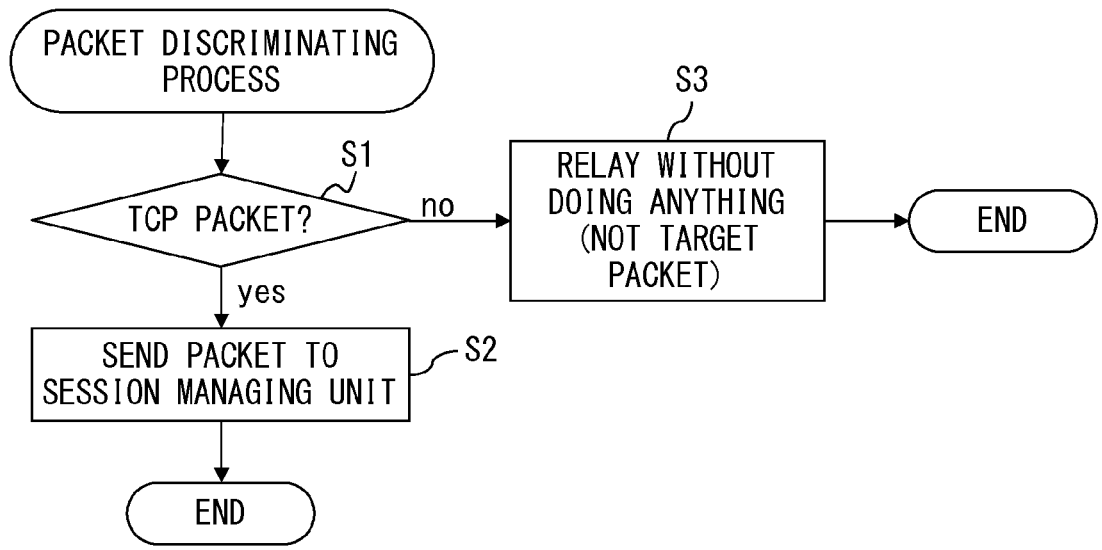
FIG. 10 is a flowchart presenting the discriminating process of a received packet.

FIG. 10 is a flowchart illustrating a discriminating process of a received packet by the packet discriminating unit 21 in FIG. 3. The bandwidth adjusting apparatus 1 starts the process illustrated in FIG. 10 as the reception of a packet from other modules 30, 32 as a trigger.

First, in step S1, whether or not the received packet is a TCP packet is determined, and if it is a TCP packet (if yes in step S1), in step S2, the received packet is passed to the session managing unit in FIG. 3, and the process is terminated. If the determination is made that the received packet is not a TCP packet in the determination in step S1 (if no in step S1), the process proceeds to step S3 with no particular process performed in the bandwidth adjusting apparatus 1, and the packet is relayed and the process is terminated.

The discrimination of the packet in step S1 is, in the embodiment, made by referring to a predetermined field in the IP header. For example, whether it is a TCP packet or not is determined by referring to the value of Protocol field in IPv4, and by referring to the value of Next Header field in IPv6. Since it is a known technique, detail explanation regarding the format of the IP header is omitted.

As illustrated in FIG. 10, in the embodiment, whether or not it is a TCP packet is determined, and all TCP packets are processed as being the target of the bandwidth adjustment, but this is not a limitation. For example, variations are possible such as to refer to the IP address and the port number included in the IP header and the TCP header in step S1, and if the address and the port number belong to a predetermined range, the process proceeds to step S2, and they are regarded as the target packet of the bandwidth adjustment. By regarding the IP address and port number in a predetermined range as the target of the bandwidth adjustment, it becomes possible to perform the bandwidth adjustment proactively for the communication between certain terminals. The present invention may be applied generally to communication protocols to store values that can be used as an index to identify a session and values indicating the order of packets in the session. Such communication protocols include, for example, IPsec (Security Architecture for Internet Protocol) ESP (Encapsulating Security Payload), RTP (Real-time Transport Protocol) and the like.

Figure 11:
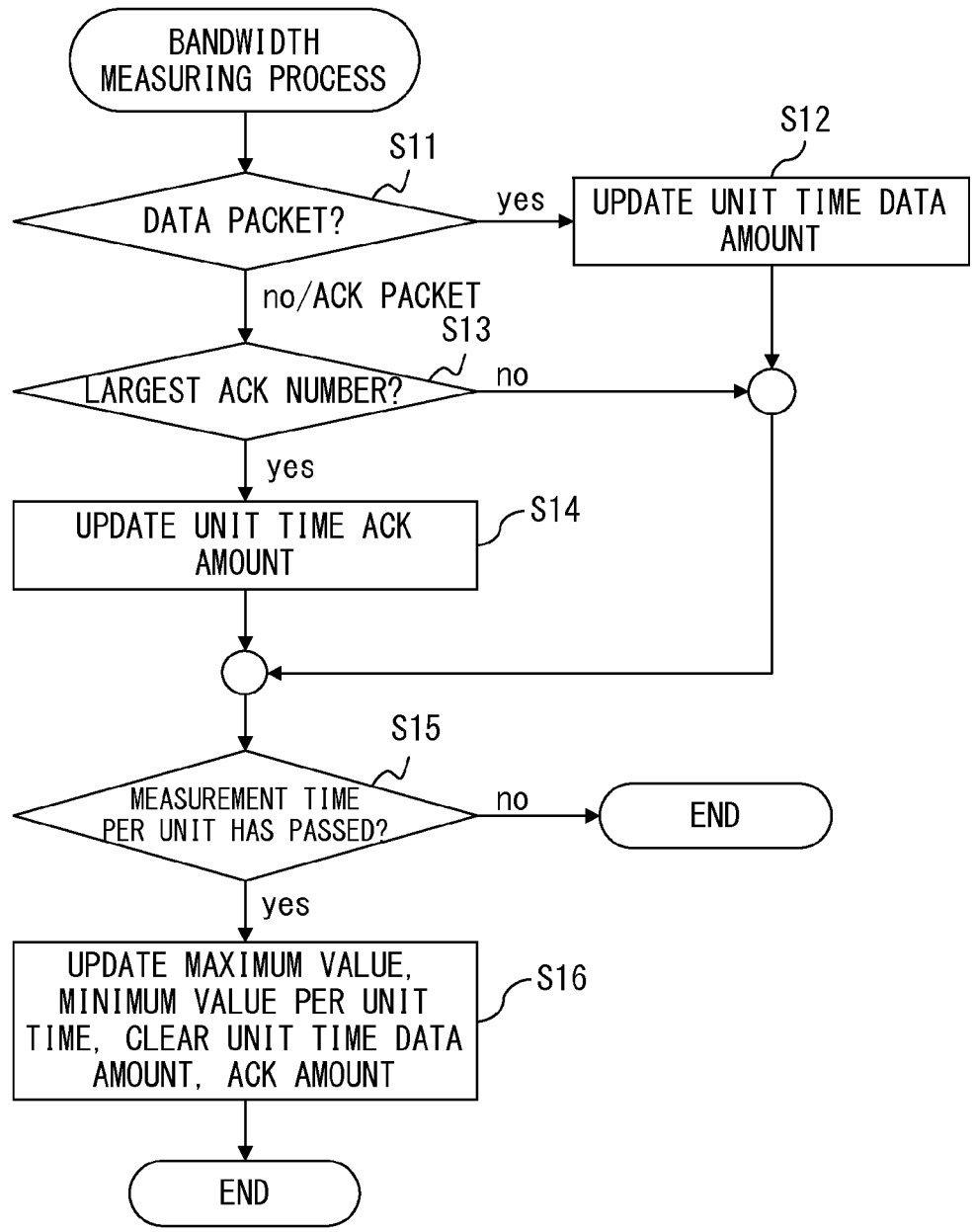
FIG. 11 is a flowchart presenting a bandwidth measuring process.

FIG. 11 is a flowchart illustrating the bandwidth measuring process by the receiving bandwidth measuring unit 23. The packet that has been regarded as the target of the bandwidth adjustment by the discriminating process of the packet in FIG. 10 is passed to the session managing unit 22 in FIG. 3. The session managing unit 22 registers necessary information in the session table 13, and passes the packet to the receiving bandwidth measuring unit 23. Upon receiving the packet from the session managing unit 22, the receiving bandwidth measuring unit 23 of the bandwidth adjusting apparatus 1 starts the process illustrated in FIG. 11.

First, in step S11, whether or not the packet is a data packet is determined. If the packet received from the session managing unit 22 is a data packet (if yes in step S11), the process proceeds to step S12. In step S12, the data amount relayed per unit time is updated, which is independent from whether the sequence number of the data packet is duplicate with that of the packet received previously, and the process proceeds to step S15. If the packet received from the session managing unit 22 is an ACK packet (if no in step S11), the process proceeds from step S11 to step S13.

In step S13, whether the ACK number of the received packet is the largest ACK number of not is determined. While details are to be described later, the largest ACK number refers to the one with the largest value among the ACK numbers included in the ACK packets that the bandwidth adjusting apparatus 1 received. The determination in step S13 is performed by comparing the largest ACK number held in the session table 13 and the ACK number of the received packet. If the ACK number of the received packet is the largest (if yes in step S13), the process proceeds to step S14. In step S14, the ACK amount per unit time is updated, and the process proceeds to step S15. If the ACK number of the received packet is not the largest (if no in step S13), the ACK packet of the ACK number is regarded as having already been relayed, and the process proceeds to step S15 with no particular process performed.

In step S15, whether or not the unit measurement time per unit has passed or not is determined, and if the unit measurement time per unit has not passed yet (if no in step S15), the process is terminated with no particular process performed. The unit measurement time refers to the time determined in advance to perform the measurement of the data amount of the data packet and the ACK amount of the ACK packet, and its value is stored in the session table 13. Details are to be explained with reference to FIG. 30.

If it is determined that the unit measurement time has passed in step S15 (if yes in step S15), the maximum value and the minimum value of the data amount/ACK amount per unit time is updated in step S16. Along with this, the value of the data amount/ACK amount per unit time updated respectively in step S12 and in step S14 is cleared, and the process is terminated.

The bandwidth adjusting unit 24 performs the bandwidth adjusting process based on the comparison of the target bandwidth and the measured bandwidth obtained by the bandwidth measuring process illustrated in FIG. 11. The trigger to perform the bandwidth adjusting process includes the timing at which the bandwidth adjusting apparatus 1 receives the relay packet, and the timing of a regular interrupt process, for instance. In the embodiment, the bandwidth adjustment is to be performed at the timing of the regular interrupt process, and the bandwidth adjusting process in this case is explained with reference to FIG. 12.

Figure 12:
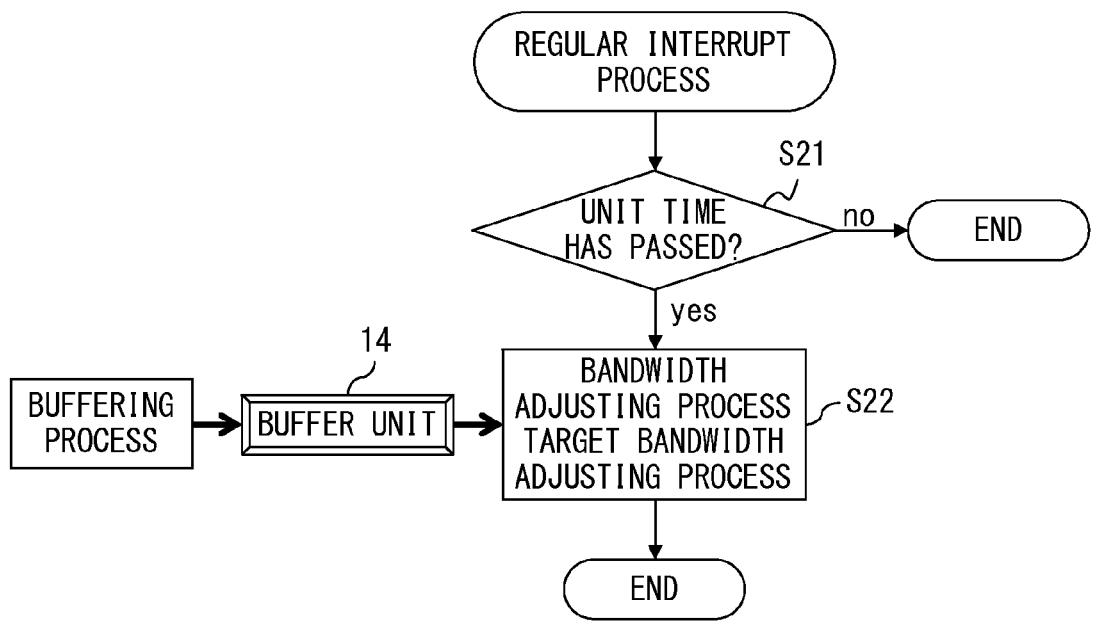
FIG. 12 is a flowchart presenting an interrupt process in a bandwidth adjusting process.

FIG. 12 is a flowchart illustrating the interrupt process of the bandwidth adjusting process by the bandwidth adjusting unit 24. As described above, in the embodiment, the bandwidth adjusting apparatus 1 starts the process illustrated in FIG. 12 regularly at a predetermined time interval.

First, in step S21, whether or not the unit time of the interrupt period to perform the interrupt process has passed is determined. If the period of the interrupt process has not passed yet (if no in step S21), the process is terminated with no particular process performed.

On the other hand, if the period of the interrupt process has passed (if yes in step S21), the process proceeds to step S22, the bandwidth adjusting process, and if determined as necessary, a process to adjust the target bandwidth are performed. Details of the bandwidth adjusting process and the process to adjust the target bandwidth are to be described later. In addition, if necessary upon the execution of the bandwidth adjusting process, the packet that has been buffered in the buffer unit 14 is used. The buffering process is to be described later. The process is terminated after executing the bandwidth adjusting process.

Figure 13:
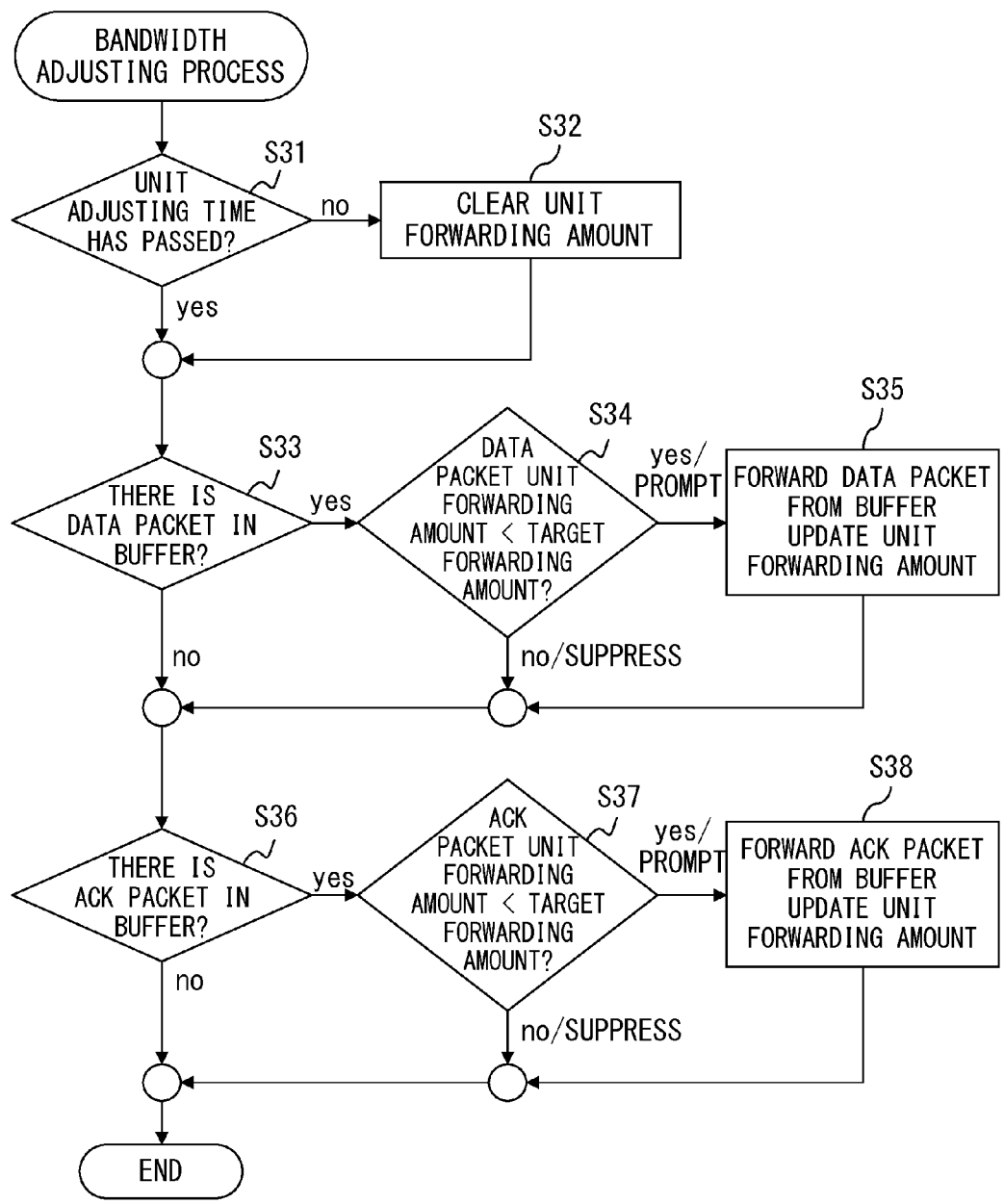
FIG. 13 is a flowchart presenting the bandwidth adjusting process.

FIG. 13 is a flowchart illustrating the bandwidth adjusting process by the bandwidth adjusting unit 24. As described above, the process illustrated in FIG. 13 starts with the regular interrupt process and the reception of the relay packet as a trigger.

First, in step S31, whether or not the unit adjusting time has passed is determined. The "unit adjusting time" refers to the time to measure the data forwarding amount of the relay apparatus 3. If the unit adjusting time has not passed (if no in step S31), the process proceeds to step S32. In step S32, the held unit forwarding amount is cleared, and the process proceeds to step S33. If the unit adjusting time has already passed (if yes in step S31), the process proceeds to step S33 with no particular process performed.

In step S33, whether or not the data packet has been buffered in the buffer unit 14 in FIG. 3 is determined. If the data packet has been buffered in the buffer unit 14 (if yes in step S33), the process proceeds to step S34, and further, the bandwidth regarding the data packet and the target bandwidth are compared. Specifically, whether or not the unit forwarding amount of the data packet is below the target forwarding amount read out from the session table 13 is determined. Here, "the unit forwarding amount of the packet" refers to the data amount forwarded by the bandwidth adjusting apparatus 1 within the unit adjusting time, and being the forwarding data amount for the direction measured in the bandwidth measuring process in FIG. 11.

If the data packet has not been buffered in the buffer unit 14 in step S33 (if no in step S33), the process proceeds to step S36.

If the unit forwarding amount of the data packet above is the target forwarding amount in step S34 (if no/throttle in step S34), the throttle of the bandwidth is performed, and the process proceeds to step S36. As described above, in the throttling process of the bandwidth, the transmission interval of the data packets is controlled so that the unit forwarding amount of the data packet falls within a predetermined range.

If the unit forwarding amount of the data packet is below the target forwarding amount in step S34 (if yes/enhance in step S34), the process proceeds to step S35, and the enhance of the bandwidth is performed. As described above, in the enhancing process of the bandwidth, the data packet that has been buffered in the buffer unit 14 is forwarded according to the target forwarding amount.

After the bandwidth control process for the transmitting direction is performed, the bandwidth control process for the receiving direction in and after step S36 is performed. The processes from step S36-step S38 are processes to perform the throttling or enhancing of the bandwidth according to the magnitude relation of the unit forwarding amount and the target forwarding amount of the ACK packet if the ACK packet has been buffered in the buffer unit 14, which correspond to the processes for the data packet in step S33-step S35, respectively.

Meanwhile, the interrupt period in step S21 in FIG. 12 is set as a shorter time than the unit adjusting time in step S31 in FIG. 13. This is in order not to make a blank period in which the bandwidth adjusting process is not performed, by setting the interrupt period shorter than the unit adjusting time.

As described above, according to the bandwidth adjusting apparatus 1 according to the present embodiment, the TCP packet forwarding amount that goes through the bandwidth adjusting apparatus 1 is monitored to obtain the bandwidth, and if it exceeds the target bandwidth required for the communication, the packet transmission is controlled to throttle the bandwidth. If the obtained bandwidth is below the target bandwidth, the packet that has been buffered is retransmitted (proxy retransmission) in place of the transmitting terminal 2A and the receiving terminal 4B, to enhance the bandwidth.

One of the problems with the conventional TCP communication is occurrence of burst traffic, that is, temporary traffic with a high peak. The cause of the occurrence of burst traffic is that, for example, after the start of a session, forwarding starts with the initial value, and burst traffic is transmitted "for the first time". In the communication between a server that provides service and a user, the network on the user side is often connected as a slower access network in contrast with the network on the server side. If the server transmits burst traffic under such a configuration, the user side is unlikely to be able to receive the burst traffic. In the burst traffic that cannot be received by the user side, the discarding of the packet is likely to occur at the connection point of the access network of the user side.

Meanwhile, in the TCP communication, the application program transmits data, which is processed by the protocol stack of the TCP and IP using the mechanism of the operating system, and the network driver eventually transmits the data. In a normal computer system, the application program and the operating system operate with a scheduling in a time-divisional manner. For this reason, every time when transmitted data goes through various programs, scheduling is involved, and a process is to be performed in a bursting manner. There is a strong tendency that in a server with a large load, the bursting nature of the process expands, possibly leading to the burst traffic.

The burst traffic may become a cause of congestion in the network path. Particularly, in a router rand the like that aggregate many TCP sessions, there is always a risk of occurrence of congestion. However, according to the bandwidth adjusting apparatus 1 according to the present embodiment, when the actual bandwidth exceeds the target bandwidth, the throttling of the bandwidth is performed. Accordingly, it becomes possible to hold down the burst traffic effectively.

Furthermore, the bandwidth adjusting apparatus 1 measured the bandwidth of the packet that goes through itself, and controls the packet that goes through itself. There is no need for the receiving terminal 4B to send notification of packet discarding information and for the transmitting terminal 2A to measure delay for every packet, as in the conventional TFRC (TCP-Friendly Rate Control). In addition, if the bandwidth adjusting apparatus 1 is provided on the path, the bandwidth adjusting process described above may be performed, so it is not necessary for the transmitting terminal 2A and the receiving terminal 4B to be equipped with the bandwidth adjusting apparatus 1.

In addition, if it is assumed that the packet is altered to change the packet length, the packet needs to be made again at the apparatus that performs the bandwidth adjustment, which causes concerns for the increase in processing load and influence on other network devices. However, in the bandwidth adjusting method according to the present embodiment, since only the forwarding interval of packets is controlled, such a problem does not occur.

Then, in the bandwidth adjusting method according to the present embodiment, the communication in which the measured bandwidth is over/below the target bandwidth is determined as requiring the bandwidth adjustment, and the throttling/enhancing of the bandwidth is performed respectively. For the communication that does not require the execution of the bandwidth adjustment, only the forwarding of the packet is performed. Since the bandwidth adjustment is performed in such a method, even if conflict between communication that requires the bandwidth adjustment and communication that does not require the bandwidth adjustment occurs in the relay apparatus 3, it does not affect the speed of the communication that does not require the bandwidth adjustment.

[Buffering]

As described in the explanation of the bandwidth adjusting process above, the bandwidth adjusting apparatus 1 according to the present embodiment performs the throttling and enhancing of the bandwidth by buffering the packet in the buffer unit 14. Next, the method to use the buffered packet is explained.

Figure 14:
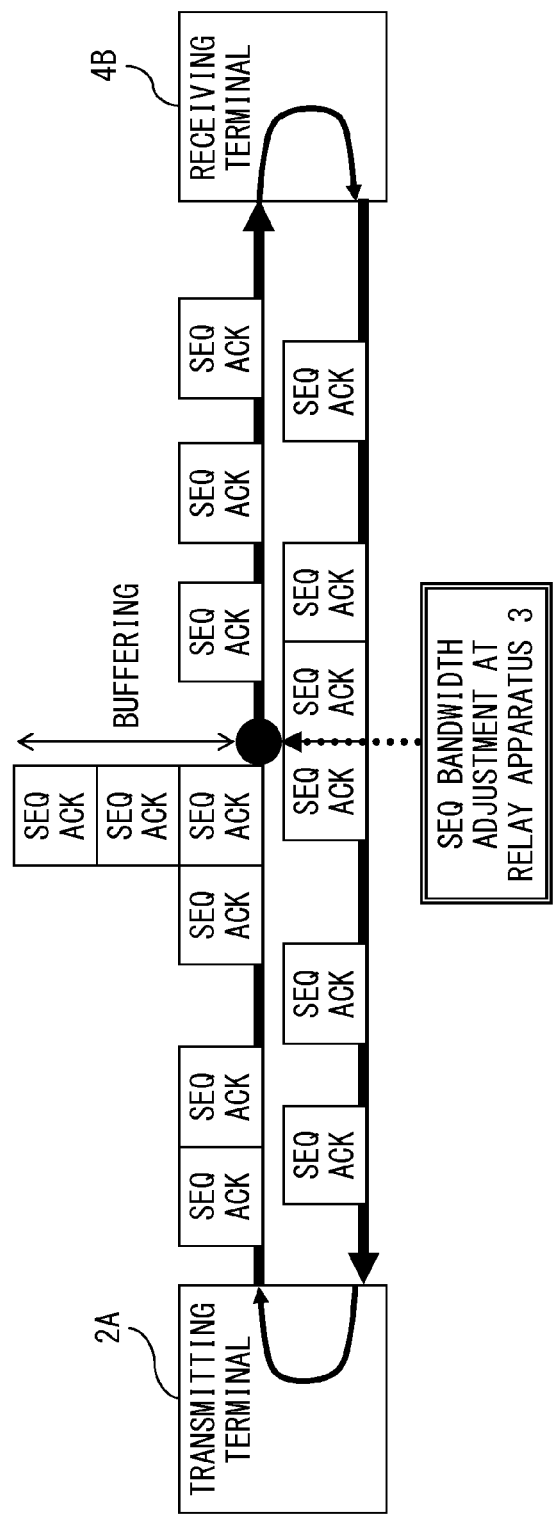
FIG. 14 is a diagram illustrating a method for buffering for a data packet.

FIG. 14 is a diagram illustrating the method to buffer the data packet.

As illustrated in FIG. 14, the bandwidth adjusting apparatus 1 provided in the relay apparatus 3 buffers the data packet in the buffer unit 14 in FIG. 3. Then, the bandwidth adjusting apparatus 1 duplicates the data packet buffered in the buffer unit 14, and performs a process such as to transmit the duplicated data packet to the receiving terminal 4B.

When the bandwidth adjusting apparatus 1 monitors the space in the buffer unit 14 and recognizes the depletion of the memory of the bandwidth adjusting apparatus 1 and the relay apparatus 3, the data packet may be discarded without being buffered. Even if the discarded data packet has not reached the receiving terminal 4B, since the transmitting terminal 2A retransmits the data packet later by the function of the TCP, no problem in communication occurs.

The ACK packet is also buffered in a similar way. In a similar manner to the buffering of the data packet, even if the ACK packet is discarded when the capacity of the memory is exceeded, since the receiving terminal 4B retransmits the ACK packet by the function of the TCP, no problem in communication occurs.

Furthermore, the configuration may be made so that the bandwidth adjusting apparatus 1 performs the following processes using the buffering function of the packet in the buffer unit 14.

For example, the data packets and the ACK packets to be buffered may be buffered while arranging them in order of the sequence number and the ACK number. For example, depending on the path of the network, the order to arrive at the receiving terminal 4B may change. Even in such a case, by arranging the packets in order of the sequence number and the ACK number, the order may be corrected in the network device (in the embodiment, the relay apparatus 3) that has the bandwidth adjusting apparatus 1.

In addition, the sequence number and the ACK number and the like of a received packet may be compared with those of a packet that has already been buffered in the buffer unit 14, and a redundant packet may be discarded without being buffered. At the terminal apparatus (the receiving terminal 4B and the transmitting terminal 2A) that receives the packet, the need for the process to discard a redundant packet is eliminated.

Figure 15:
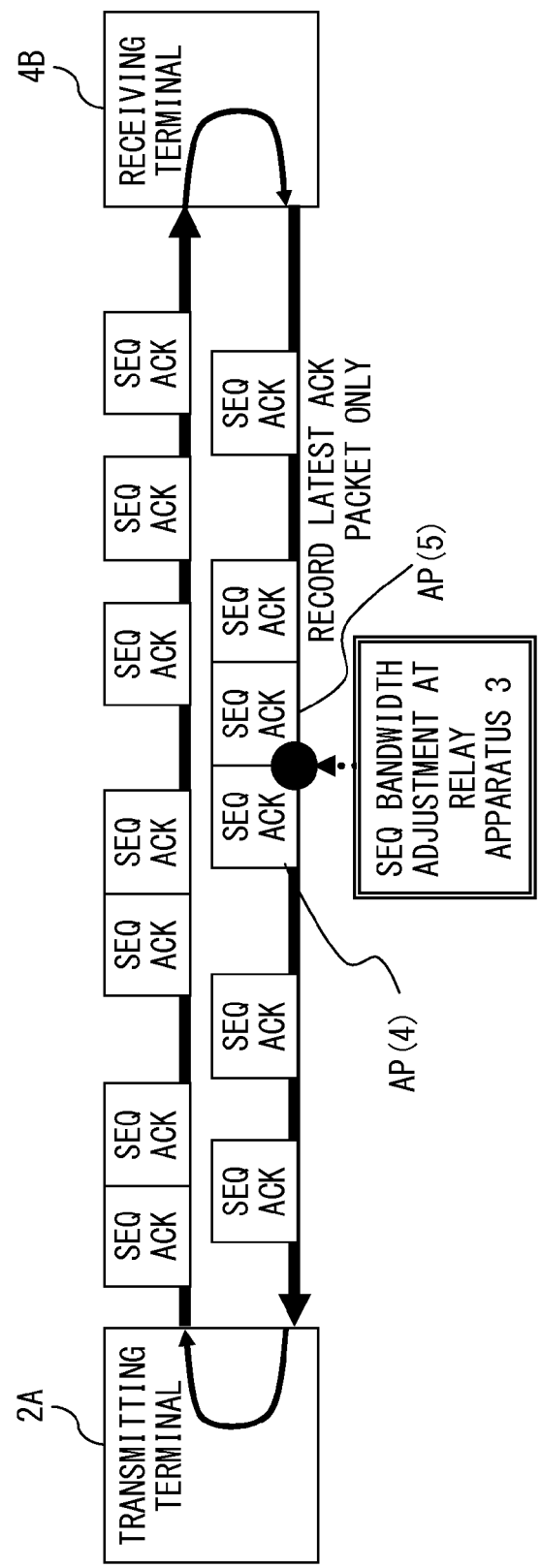
FIG. 15 is a diagram illustrating a method to use a buffered ACK packet.

FIG. 15 is a diagram illustrating the method to use a buffered ACK packet.

Regarding the ACK packet, further, the configuration may be made so as to limit the number of packet to be buffered to 1. The ACK packet having the largest ACK number among the ACK numbers of the ACK packet that the bandwidth adjusting apparatus 1 received is buffered. This is because, with the TCP, as long as the largest ACK number is given, the sequence number of the data packet to be transmitted next may be determined. In the example in FIG. 15, when the bandwidth adjusting apparatus 1 of the relay apparatus 3 receives an ACK packet AP (5) of the ACK number "5" from the receiving terminal 4B, it discards the ACK packet AP (4) of the ACK number "4" that had been held until then in the buffer unit 14, and buffers the ACK packet AP(5) having the largest ACK number. Then, the enhancing process of the bandwidth described above is performed using the ACK packet AP(5).

Even in a case such as when the data packet has not been received at the receiving terminal 4B due to packet loss and the like, it becomes possible to provide stable communication by performing the enhancing process of the bandwidth, as described above. Therefore, even if the number of ACK packet to be buffered is 1, the bandwidth adjusting apparatus 1 performs the bandwidth adjustment by duplicating and transmitting the buffered ACK packet (in FIG. 15, the ACK packet AP(5)).

Incidentally, it is desirable that for the period in which the receiving terminal 4B is not receiving the data packet, the ACK packet is sent back to the transmitting terminal 2A at a certain frequency (for example, the target bandwidth). Therefore, the bandwidth adjusting apparatus 1 duplicates and transmits the ACK packet buffered in the buffer unit 14 so that the ACK packet is sent back to the transmitting terminal 2A at a predetermined frequency. The ACK packet duplicated and transmitted from the buffer unit 14 is transmitted from the receiving terminal 4B, and is to be received at the transmitting terminal 2A redundantly. But the transmitting terminal 2A performs the process within the range of the known IP network specification. Therefore, no problem occurs in the communication due to such a retransmission.

Next, regarding the buffering process described above, the method to manage the buffer memory constituting the buffer unit 14 is explained with reference to FIG. 16 and FIG. 17. The buffer unit 14 is managed by the session table 13, and is a queue prepared for each of the A->B direction and the B->A direction in FIG. 2. The queue is realized by a data structure such as a linked list and the like. Since the linked list is a known technique, explanation is omitted.

Figure 16:
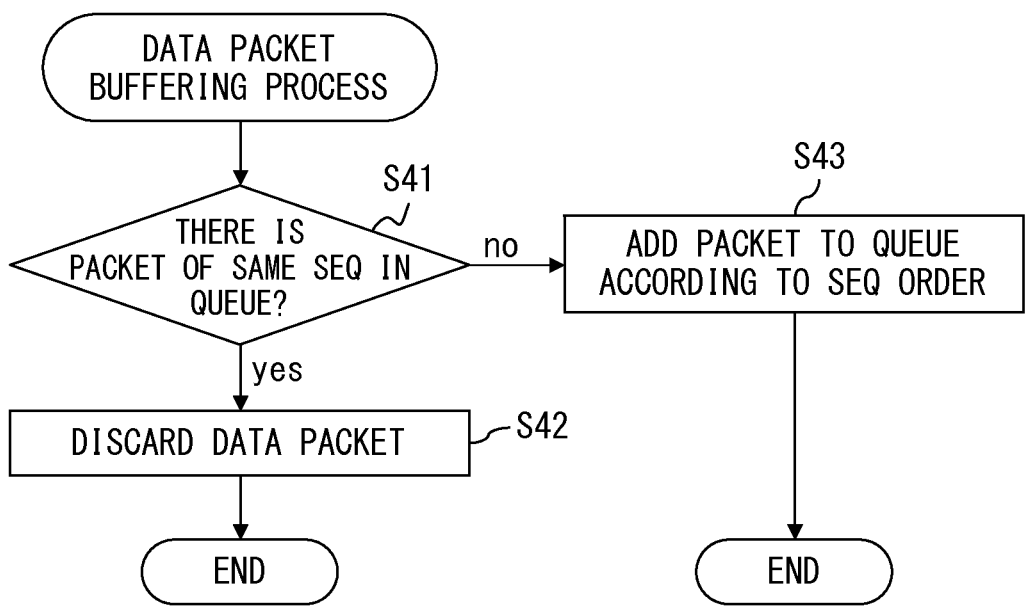
FIG. 16 is a flowchart presenting a buffering process of a data packet.

FIG. 16 is a flowchart illustrating the buffering process of the data packet. Upon receiving a data packet from the setting managing unit 22, the receiving bandwidth measuring unit 23 of the bandwidth adjusting apparatus 1 in FIG. 3 starts the process illustrated in FIG. 16.

First, in step S41, whether or not a data packet having the same sequence number as the sequence number of the received data packet exists in the queue (the buffer unit 14) is determined. If a data packet having the same sequence number exists (if yes in step S41), the process proceeds to step S42, where the received data packet is discarded, and the process is terminated.

If there is no data packet having the same sequence number in the determination in step S41 (if no in step S41), the process proceeds to step S43, where the data packet is added to the queue according to the order indicated by the sequence number, and the process is terminated.

Figure 17:
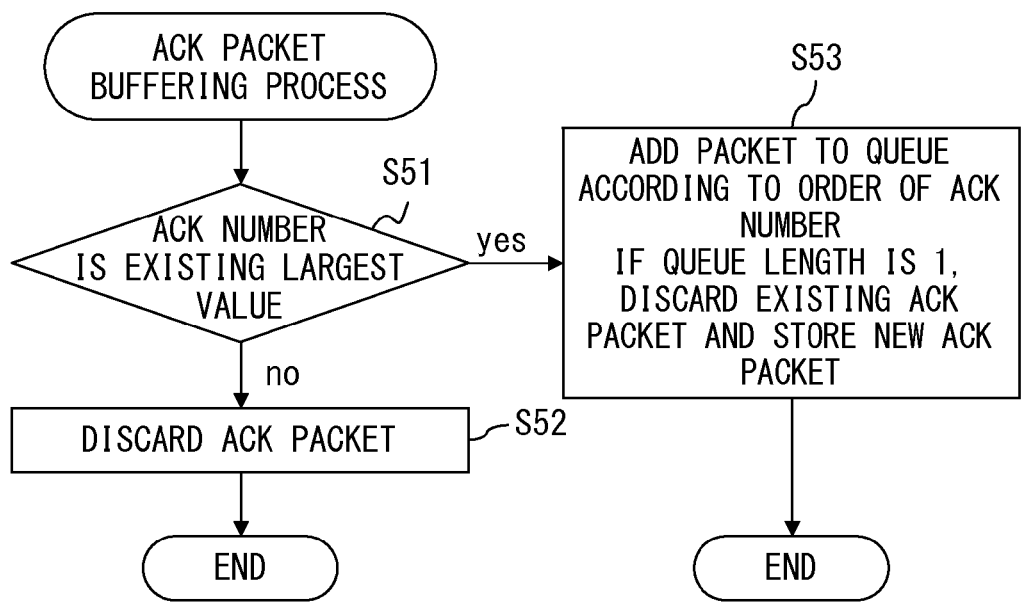
FIG. 17 is a flowchart presenting a buffering process of an ACK packet.

FIG. 17 is a flowchart illustrating the buffering process of the ACK packet. Upon receiving an ACK packet from the setting managing unit 22, the receiving bandwidth measuring unit 23 of the bandwidth adjusting apparatus 1 in FIG. 3 starts the process illustrated in FIG. 17. FIG. 17 illustrates a process to buffer an ACK packet having the largest ACK number.

First, in step S51, whether or not the ACK number of the received ACK packet has the largest value is determined. If the ACK number of the received ACK packet is not the largest value among the ACK packets that have been received so far (if no in step S51), the process proceeds to step S52, where the received ACK packet is discarded, and the process is terminated.

If the ACK number of the received ACK packet has the largest value in the determination in step S51 (if yes in step S51), the process proceeds to step S53. Then, in the case of the configuration in which the bandwidth adjusting apparatus 1 holds a plurality of ACK packets, the ACK packet is added to the queue according to the order indicated by the ACK number. In the case of the configuration in which the length of the queue is 1 and only one ACK packet is held, the ACK packet held in the queue is discarded and the received new packet is stored in the queue, then the process is terminated.

Since the buffering processes in FIG. 16 and FIG. 17 are processes performed when the bandwidth adjustment described above is performed, unlike the conventional art, the transmitting terminal 2A does not keep transmitting too many packets continuously. Accordingly, there is no occurrence of an endless increase in the number of packets to be buffered, and a consistently large value.

As described above, in the embodiment, at least two buffer memories for the respective communication directions of a certain session, that is, for the buffering of the data packet and for the buffering of the ACK packet are prepared. The number of packets to be buffered in each buffer memory depends on the difference between the target bandwidth and the measured bandwidth. For example, regarding the number of packets to be buffered for the data packet, for example, the approximate number of packets of the TCP window size during the initial forwarding of the TCP communication is set. Assuming the area to store the packet data of the buffer memory as 64 kilobytes and the TCP window size during the initial forwarding as 1450 bytes, the number of packets is about 64 KB/1450B=45 packets.

Since the buffer memory for the packets include not only the data of the packets but also managing information for performing the management of the buffer unit 14, the amount of memory is larger than the packet length. Here, assuming that 2 kilobytes per packet, up to 50 packets per session are to be buffered, the amount of memory required is 100 kilobytes per session, 1 gigabytes for 10,000 session.

Since the transmitting bandwidth from the transmitting terminal 2A is controlled according to the target bandwidth by the bandwidth adjusting process, the average buffered amount per session becomes 10 packets or less actually. If a buffer memory of 1 gigabyte is prepared, it is possible to process even a simultaneous relay of 100,000 sessions.

Even in a case in which the capacity of the buffer memory has been secured in preparation for relaying a plurality of sessions simultaneously, the depletion of the buffer memory may still occur. In such a case, the bandwidth adjusting process is continued without buffering the packet. As described above, since the transmitting terminal 2A and the receiving terminal 4B performs the retransmission of the packet by the function of the TCP, no problem in communication occurs even if the buffering is not performed when the memory is depleted. Although there is a possibility that the buffer memory is temporarily overloaded, the bandwidth adjusting process may be performed without negatively affecting the communication.

Figure 18:
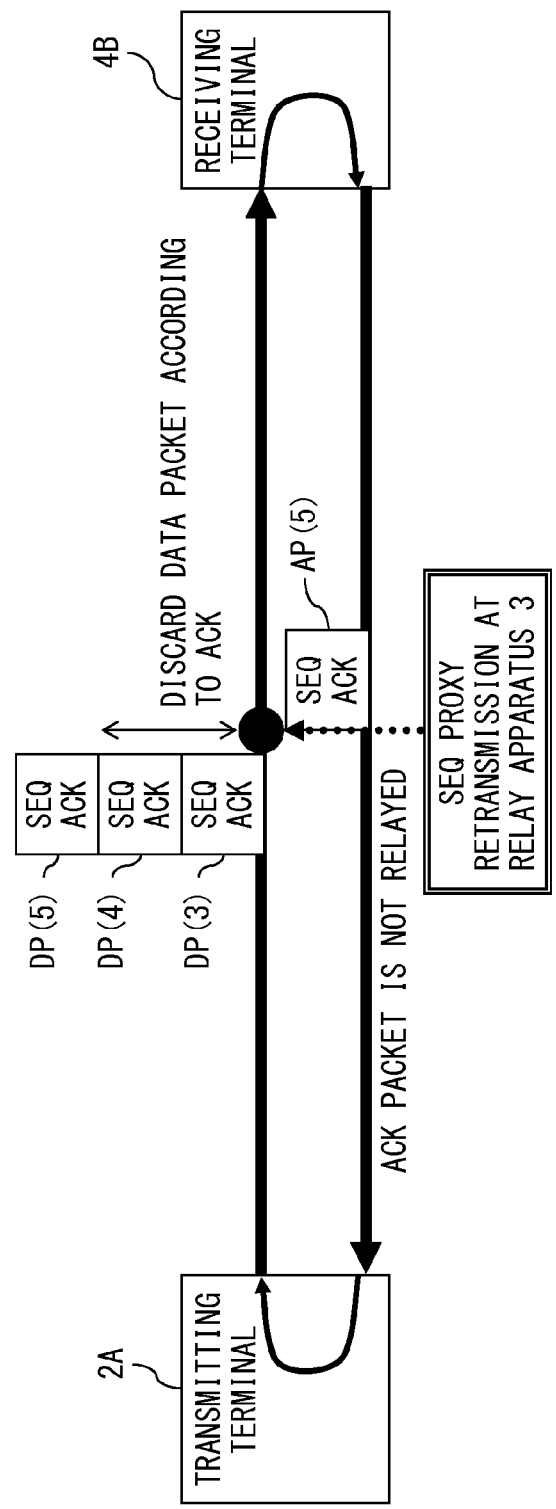
FIG. 18 is a diagram illustrating a process to discard buffer data.

Furthermore, when the network device having the bandwidth adjusting apparatus 1 is the relay apparatus 3 as in the embodiment, the configuration may also be made so as to determine and discard a data packet for which no buffering is required among packets stored in the buffer unit 14. With reference to FIG. 18, the method to discard a data packet for which no buffering is required is explained.

FIG. 18 is a diagram illustrating the process to discard buffer data.

Upon receiving a data packet, the receiving terminal 4B sends back an ACK packet while including the sequence number of the data packet that the transmitting apparatus 2A should transmit next, in the ACK number. Upon receiving the ACK packet the relay apparatus 3 having the bandwidth adjusting apparatus 1 according to the present embodiment refers to the sequence number of data packets in the buffer unit 14. Then, if a data packet of the sequence number corresponding to the received ACK number has been buffered, the ACK packet is discarded without being relayed, and determination is made that unnecessary data packets have been buffered. Then, data packets that are older than the ACK number are discarded. That is, data packets having smaller sequence numbers than the sequence number of the packet that the transmitting terminal 2A next are discarded.

Furthermore, the relay apparatus 3 determines that, for data packet of sequence numbers whose values are smaller than the ACK number, buffering and forwarding are not required, and discards them.

In the example illustrated in FIG. 18, the relay apparatus 3 having the bandwidth adjusting apparatus 1 receives the ACK packet AP (5) of the ACK number "5". This indicates that the receiving apparatus 4B has already received the data packet DP (4) of the sequence number "4". Therefore, the relay apparatus 3 determines that, for the data packets DP (4), DP (3) whose sequence number is 5−1=4 or smaller, the buffering and forwarding are not required, and discards them.

Thus, by referring to the ACK number of the ACK packet and discarding old data packets at the relay apparatus 3 having the bandwidth adjusting apparatus 1, unnecessary traffic from the relay apparatus 3 to the receiving terminal 4B is reduced, which contributes to saving the required buffer amount.

Meanwhile, as described earlier, with the bandwidth adjusting apparatus 1 according to the present embodiment, the bandwidth adjustment may be performed in a case in which a packet in only one direction of two directions of the A->B direction and the B->A direction is relayed. However, regarding the process to discard the packet illustrated in FIG. 18, the data packet, that is, the communication in the A->B direction is controlled based on the status of the ACK packet, that is, the communication in the B->A direction. Therefore, the process of discarding the packet in FIG. 18 may be applied to the case in which the communication in both directions is monitored.

[Proxy Retransmission]

In the explanation of the enhancing process of the bandwidth, the bandwidth adjusting apparatus 1 transmitting the packet in place of the transmitting terminal 2A and the receiving terminal 4B (proxy retransmission) was described. Here, the specific method of the proxy retransmission and its application example are explained in detail.

Figure 19:
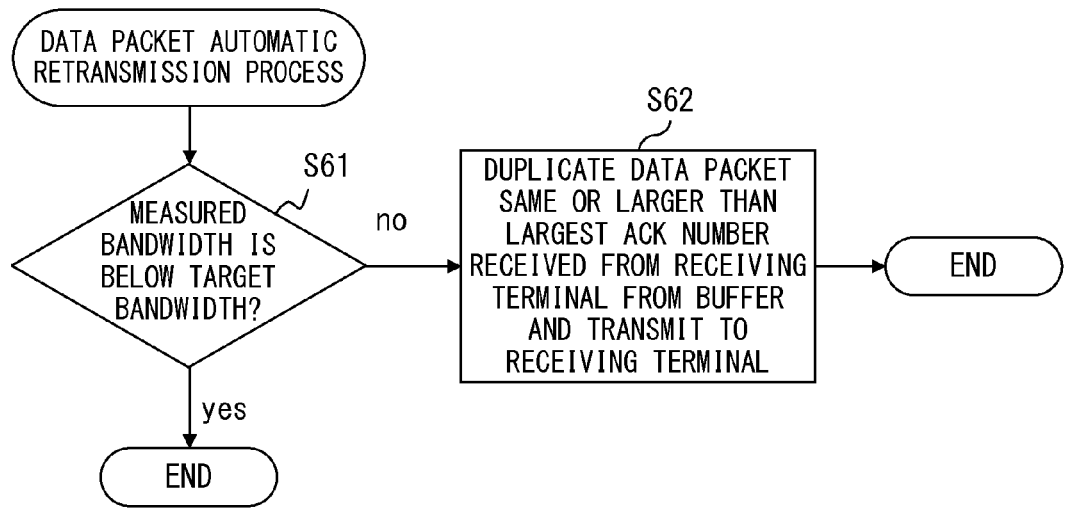
FIG. 19 is a flowchart presenting a proxy retransmission process of a data packet.

FIG. 19 is a flowchart illustrating the proxy retransmission process of the data packet. For example, the bandwidth adjusting unit 24 of the bandwidth adjusting apparatus 1 in FIG. 3 performs the proxy retransmission process of the data packet illustrated in FIG. 19, as well as the bandwidth adjusting process illustrated in FIG. 13.

First, in step S61, whether or not the measured bandwidth is below the target bandwidth is determined. If the measured bandwidth is below the target bandwidth (if yes in step S61), no particular process is performed, and the process is terminated.

On the other hand, if the measured bandwidth is equal to or above the target bandwidth (if no in step S61), the process proceeds to step S62. Then, the data packet having a sequence number whose value is the largest value or larger than the largest value among the ACK numbers managed in the session table 13 is duplicated from the buffer unit 14, transmitted to the receiving terminal 4B and the process is terminated.

FIG. 20 is a flowchart illustrating the proxy retransmission process of the ACK packet. In the same manner as the process illustrated in FIG. 19, the bandwidth adjusting unit 24 may also perform the proxy retransmission process of the ACK packet illustrated in FIG. 20 together when it performs the bandwidth adjusting process illustrated in FIG. 13.

First, in step S71, whether or not the measured bandwidth is below the target bandwidth is determined. If the measured bandwidth is below the target bandwidth (if yes in step S71), no particular process is performed, and the process is terminated. This is same to the case of yes in step S61 in FIG. 19.

On the other hand, if the measured bandwidth is equal to or above the target bandwidth (if no in step S71), the process proceeds to step S72. Then, the ACK packet having a ACK number whose value is the largest value among the ACK numbers managed in the session table 13 is duplicated from the buffer unit 14, transmitted to the transmitting terminal 2A and the process is terminated.

The effect of performing the proxy retransmission of the data packet and the ACK packet in the bandwidth adjusting process is as described in the explanation of the bandwidth adjusting process.

Furthermore, it is also possible to determine whether or not the retransmission of the data packet is necessary at the bandwidth adjusting apparatus 1 and to automatically retransmit the data packet when it is determined as necessary, using the proxy retransmission processes of the packets illustrated in FIG. 19 and FIG. 20.

Figure 21:
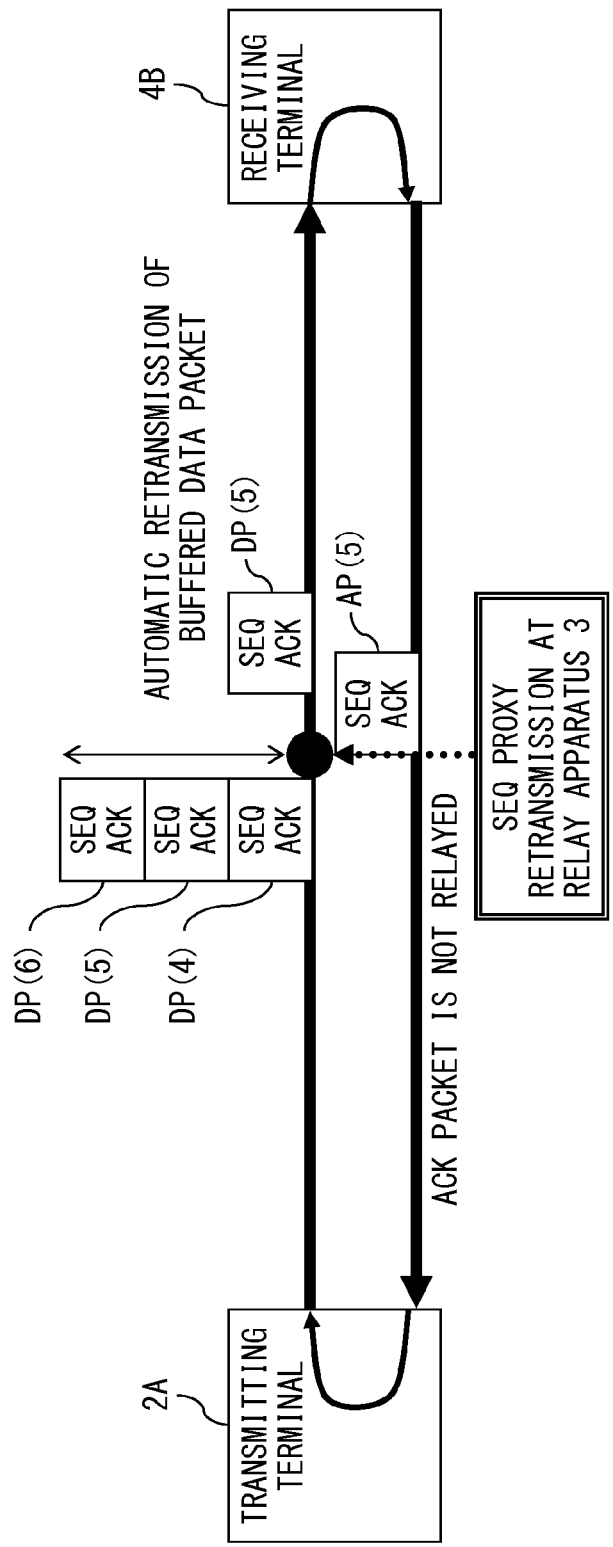
FIG. 21 is a diagram illustrating an automatic proxy retransmission method of a data packet.

FIG. 21 is a diagram illustrating the automatic proxy retransmission method of the data packet.

The bandwidth adjusting apparatus 1 (of the relay apparatus 3) that received an ACK packet transmitted from the receiving terminal 4B discards the ACK packet without forwarding the ACK packet to the transmitting terminal 2A if the data packet corresponding to the ACK packet has been held in the buffer unit 14. And the bandwidth adjusting apparatus 1 transmits the buffered data packet to the receiving terminal 4B. Compared with the case in which the transmitting terminal 2A transmits the corresponding data packet according to the ACK number included in the ACK packet, since (the bandwidth adjusting apparatus 1 of) the relay apparatus 3 transmits the data packet corresponding to the ACK packet, it is expressed as the "automatic proxy retransmission" of the data packet here.

In the example illustrated in FIG. 21, the relay apparatus 3 having the bandwidth adjusting apparatus 1 receives the ACK packet AP(5) of the ACK number "5". The bandwidth adjusting apparatus 1 does not forward the ACK packet to the transmitting terminal 2A if the data packet DP(5) of the sequence number "5" has been buffered in the buffer unit 14, and duplicates the data packet DP (5) of the sequence number "5" in the buffer unit 14 and retransmit it to the receiving terminal 4B. When it receives the ACK packet AP(6) of the ACK number "6", it also automatically retransmit the data packet DP (6) of the sequence number of the ACK number "6" in the same manner.

Meanwhile, as described earlier, with the bandwidth adjusting apparatus 1 according to the present embodiment, it is possible to perform the bandwidth adjustment even in a case in which the packet of only one direction of the two directions of the A->B direction and the B->A direction is relayed. However, regarding the automatic proxy retransmission process illustrated in FIG. 21, the data packet, that is, the communication in the A->B direction is controlled based on the status of the ACK packet, that is, the communication in the B->A direction. Therefore, the automatic proxy retransmission process may be applied in the case in which the communication in both directions is monitored.

Figure 22:
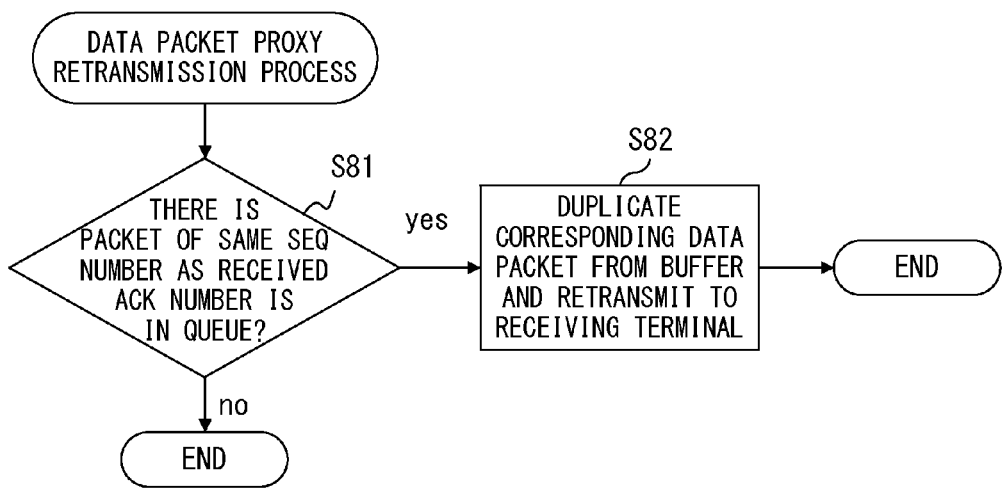
FIG. 22 is a flowchart presenting an automatic proxy retransmission process of a data packet.

FIG. 22 is a flowchart illustrating the automatic proxy transmission process of the data packet. The bandwidth adjusting unit 24 in FIG. 3 performs the process illustrated in FIG. 22 with the notification of the ACK number of the ACK packet from the bandwidth adjusting unit in the opposite direction as a trigger.

First, in step S81, whether or not the data packet of the sequence number corresponding to the ACK number (that is, matching the ACK number) of the ACK packet received at the bandwidth adjusting unit in the opposite direction has been stored in the queue in the buffer unit 14 is determined. If the corresponding data packet is not in the queue (if no in step S81), no particular process is performed, and the process is terminated.

If the corresponding data packet has been stored in the queue (if yes in step S81), the process proceeds to step S82. Then, the corresponding data packet is duplicated from the buffer unit 14, retransmitted to the receiving terminal 4B, and the process is terminated.

By performing the automatic proxy retransmission of the data packet illustrated in FIG. 21 and FIG. 22 at the relay apparatus 3 having the bandwidth adjusting apparatus 1, it becomes possible to reduce the round-trip delay time from the relay apparatus 3 to the transmitting terminal 2A and to save the traffic.

[Automatic Redundant Transmission of the Data Packet]

It is also possible to perform the redundant transmission of the data packet using the buffering function of the bandwidth adjusting apparatus 1. That is, on the path from the relay apparatus 3 having the bandwidth adjusting apparatus 1 to the receiving terminal 4B, if there is a high probability for the packet to be discarded, the relay apparatus 3 duplicates the data packet at a predetermined frequency and transmit redundantly (redundant transmission). The relay apparatus 3 determines the probability for the packet to be discarded according to the receiving status of the ACK packet.

It is also possible that the relay apparatus 3 adjusts the rate of the redundant transmission according to the result of observation of the relay bandwidth including the redundant transmission (the bandwidth in the transmitting direction of the data packet) and the receiving bandwidth (the bandwidth in the transmitting direction of the ACK packet). For example, if the receiving bandwidth is small with respect to the relay bandwidth including the redundant transmission, it is determined that there is a high probability for the data packet transmitted from the relay apparatus 3 to be discarded, and a process such as to increase the rate of data packets to be redundantly transmitted is performed.

By the redundant transmission process of the data packet as described above, it is also possible to decrease the probability for the packet to be discarded and to improve the performance of the TCP communication.

Meanwhile, as described earlier, with the bandwidth adjusting apparatus 1 according to the present embodiment, it is possible to perform the bandwidth adjustment even in a case in which the packet of only one direction of the two directions of the A->B direction and the B->A direction is relayed. However, regarding the automatic redundant transmission process of the data packet described above, the data packet, that is, the communication in the A->B direction is controlled based on the status of the ACK packet, that is, the communication in the B->A direction. Therefore, the automatic redundant transmission process may be applied in the case in which the communication in both directions is monitored.

[Multiple Usage]

Regarding the network device having the bandwidth adjusting function described above, a plurality of devices may be provided on the communication path. The bandwidth adjusting apparatus 1 only adjusts the transmission interval of packets according to the target bandwidth, without performing the change of the packet and the like. Therefore, it is possible to provide a plurality of bandwidth adjusting apparatuses on the communication path and to make a configuration in which each bandwidth adjusting apparatus 1 performs the bandwidth adjusting process. Thus, even with the configuration of multiple use of the bandwidth adjusting apparatus 1, since no change of the packet is performed, the bandwidth adjusting apparatuses 1 do not negatively affect each other. In addition, with each bandwidth adjusting apparatus 1 performing the bandwidth adjusting process, the communication stabilizes in each path, and a greater effect may be expected compared with the case in which only one unit of the bandwidth adjusting apparatus 1 performs the bandwidth adjustment.

Meanwhile, when multiple units of the bandwidth adjusting apparatus 1 are used and the buffering described above is performed in each bandwidth adjusting apparatus 1, it is desirable to set the target bandwidth relatively low. This is because an increase in delay in relaying due to the buffering being performed at multiple points on the bath is expected. By setting the target bandwidth relatively low, it becomes possible to make the frequency at which the buffering is performed to enhance the bandwidth low, and therefore, it is expected that the increase in delay in relaying may be throttled effectively.

[Service Notification]

When the session table 13 of the bandwidth adjusting apparatus 1 becomes full by managing many sessions, (the relay apparatus 3 that has) the bandwidth adjusting apparatus 1 simply performs the relaying of the packet only, for the overflow TCP session. For this reason, the bandwidth adjustment is not performed for the overflow TCP session. Even if multiple units of the bandwidth adjustment apparatus 1 is provided on the path due to the multiple usage of the bandwidth adjusting apparatus 1 described above, basically, the bandwidth adjusting process is to be performed for the TCP session carried earlier. Therefore, there is a possibility that, for the overflow TCP transmission at the first bandwidth adjusting apparatus 1, the bandwidth adjustment is not performed at the subsequent bandwidth adjusting apparatuses 1 either.

Therefore, in the system configuration with the multiple usage, information indicating whether or not the packet has been subjected to the bandwidth adjusting process in either of the bandwidth adjusting apparatuses 1 may be included in the TCP packet. The bandwidth adjusting apparatus 1 performs the bandwidth adjusting process preferentially for the packet for which the bandwidth adjusting process is not performed yet. The information indicating whether or not the packet transmitted on the path has been subjected to the bandwidth adjusting process is assumed as "service notification information", and the method to refer to the service notification information and perform the bandwidth adjusting process is specifically explained below.

Figure 23:
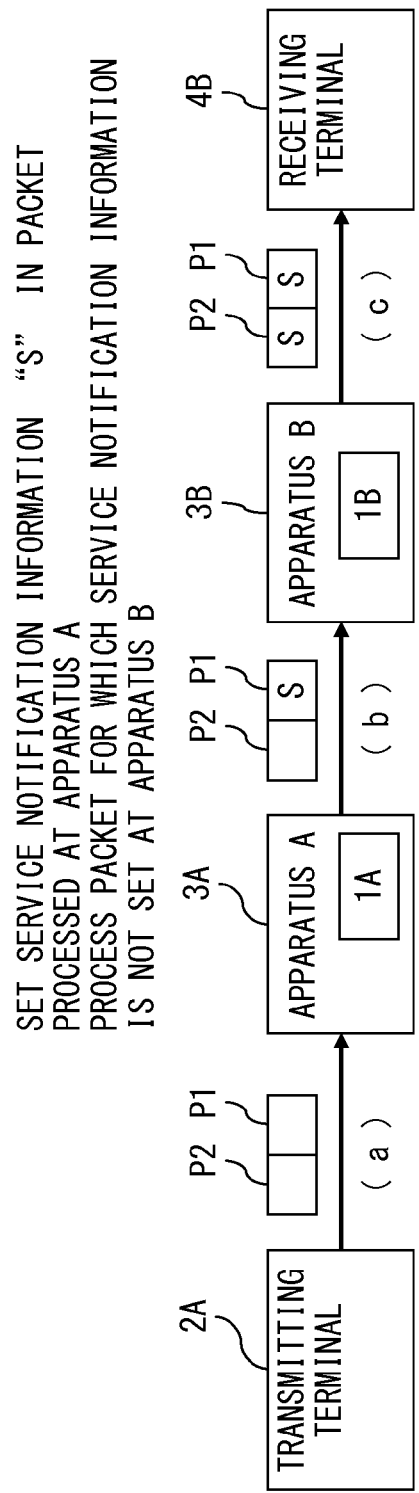
FIG. 23 is a diagram illustrating a method to distribute the bandwidth adjusting process by using service notification information.

FIG. 23 is a diagram illustrating the method to distribute the bandwidth adjusting process by using the service notification information. FIG. 23 illustrates an example of a case in which the transmitting terminal 2A and the receiving terminal 4B performs communication via two units of relay apparatuses 3A, 3B. For the sake of explanation, the paths between the transmitting terminal 2A and the relay apparatus 3A, between the relay apparatus 3A and the relay apparatus 3B, and the relay apparatus 3B and the receiving terminal 4B are assumed as path (a), (b), (c), respectively.

While two packets P1, P2 go through the paths (a)-(c) are received at the receiving terminal 4B, the relay apparatuses 3A, 3B having the bandwidth adjusting apparatus 1 relay the packets P1, P2. The bandwidth adjusting apparatuses 1A, 1B of the respective relay apparatuses 3A, 3B refer to the service notification information of the packets P1, P2, and perform distribution of the bandwidth adjusting process within the communication system, by performing the bandwidth adjustment preferentially for the packet for which the bandwidth adjusting process has not been performed yet.

In all the packets reaching the relay apparatus 3A via the path (a), a value indicating that the bandwidth adjusting process "has not been performed yet" is stored in their service notification information. The bandwidth adjusting process 1A of the relay apparatus 3A performs the bandwidth adjustment partially for the packet P1 of the relayed packets P1 and P2. The packet 2 is relayed as it is.

While among the packets reaching the relay apparatus 3B via the path (b), a value indicating that the bandwidth adjusting process "has already been performed" is stored in the service notification information of the packet P1, a value indicating that the bandwidth adjusting process "has not been performed yet" is stored in that of the packet P2. Therefore, the bandwidth adjusting apparatus 1B of the relay apparatus 3B refer to the service notification information of the packets P1 and P2, and performs the bandwidth adjustment preferentially for the packet P2 for which the bandwidth adjusting process has not been performed yet. In the path (c), the packets P1, P2 that have been subjected to the bandwidth adjustment are carried.

As described above, with the multiple units of the bandwidth adjusting apparatus 1 provided on the path and referring to the service notification information to determine the packet for which the bandwidth adjusting process has not been performed yet and to perform the bandwidth adjustment preferentially for it, the bandwidth adjusting process may be distributed. Accordingly, it becomes possible to increase the possibility that the packet carried in the path is subjected to the bandwidth adjustment in either of the bandwidth adjusting apparatus 1.

Figure 24:
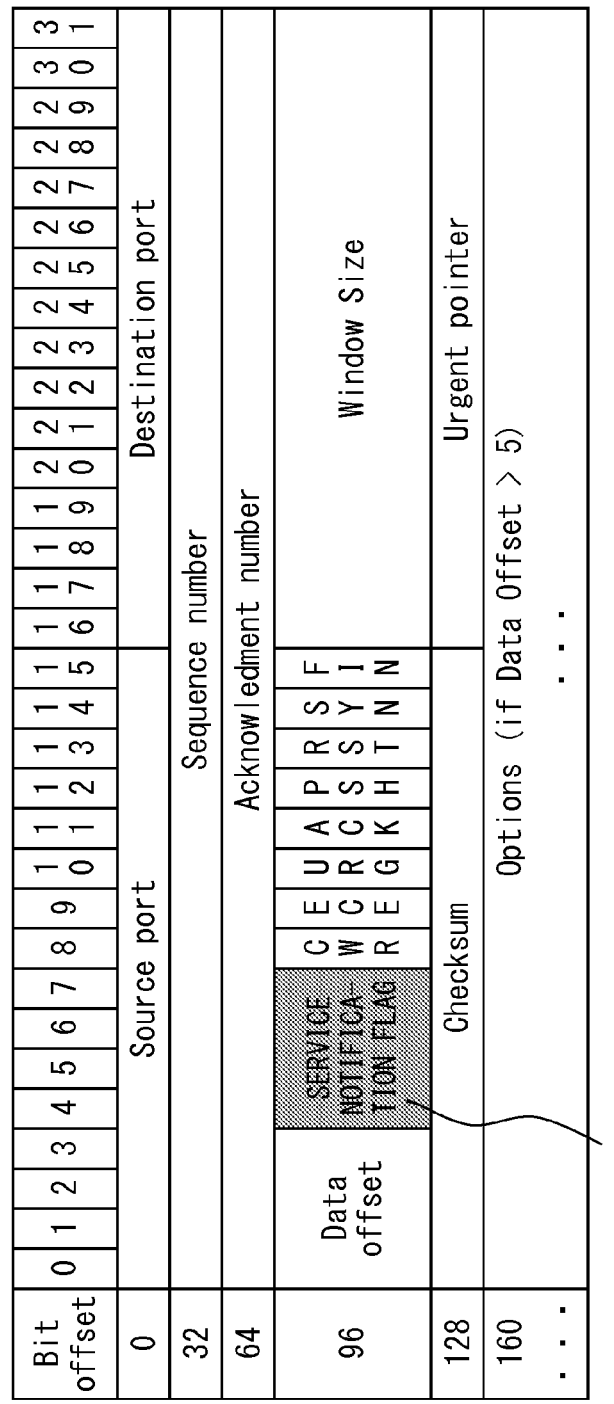
FIG. 24 is a diagram presenting an example of a setting method of the service notification information.
Figure 25:
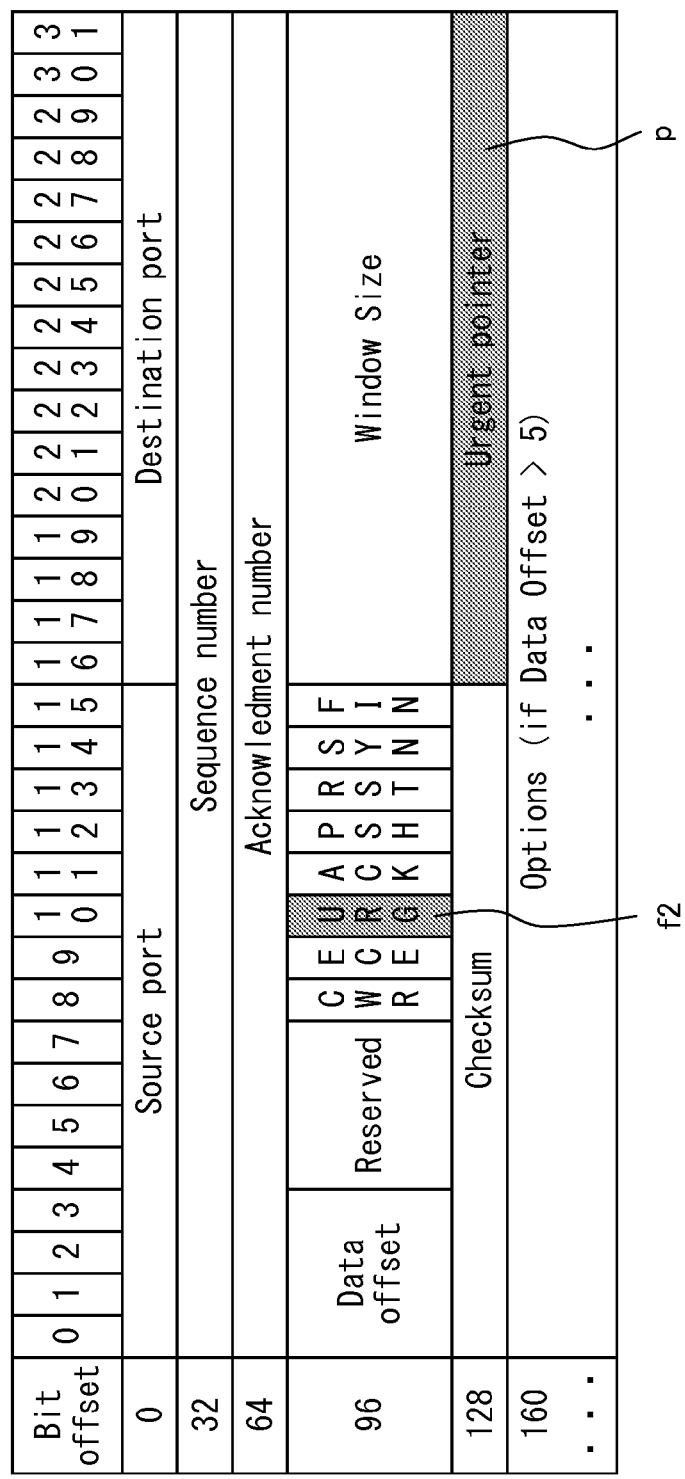
FIG. 25 is a diagram presenting another example of a setting method of the service notification information.

Next, with reference to FIG. 24 and FIG. 25, a setting example of the service notification information is explained.

FIG. 24 is a diagram illustrating an example of a setting method of the service notification information. In the example illustrated in FIG. 24, using the one bit being the reserve bit of the TCP header, the service notification information a service notification flag f1 is added to the TCP packet. It is assumed that if, for example, "1" is stored in the service notification flag f1, it indicates that the bandwidth adjusting process has already performed for the packet, and if "0" is stored, it indicates that the bandwidth adjusting process has not been performed yet. Since it is a known technique, explanation about other fields of the TCP header is omitted.

By setting the service notification flag f1 in a method as illustrate in FIG. 24 without performing the addition of a TCP option and the like, the change of the packet is kept to the minimum.

FIG. 25 is a diagram illustrating another example of the setting method of the service notification information. In the example illustrated in FIG. 25, regarding the packet with "0" being set in an Urgent (URG) flag f2 of the TCP header, the service notification information is set in an Urgent Pointer p field. Here, explanation about other fields is omitted in the same manner as for FIG. 24.

In the specification of the TCP, the urgent point p is defined as being valid only when "1" is set in the URG flag f2. For this reason, as described above, when 0 is set in the URG flag f2, the urgent pointer p is to be ignored, and does not affect the normal TCP communication.

The relay apparatus 3 having the bandwidth adjusting apparatus 1 forwards the TCP packet after setting a value indicating that the bandwidth adjusting process has already been performed, that is, "1" here, in the service notification flag (f1 and f2) of the predetermined field of the TCP header as illustrated in FIG. 24 and FIG. 25 when it performed the bandwidth adjustment for a TCP packet received from another apparatus. Since "0" is set in the packet for which the bandwidth adjusting process has not been performed yet, each bandwidth adjusting apparatus 1 determines whether or not the bandwidth adjusting process is required, referring to the value of the predetermined field.

Meanwhile, the service notification flag indicates that bandwidth adjustment has been performed by at least one of the bandwidth adjusting apparatus 1, among the multiple units of the bandwidth adjusting apparatus 1 on the path. That is, for the packet with "1" indicating the already performed status in the service notification flag, the bandwidth adjustment may be performed further by another bandwidth adjusting apparatus 1, for the multiple usage described above. The bandwidth adjusting apparatus 1 may regard the packet as the target of the bandwidth adjustment regardless of the value of the service notification flag if there is any empty space in the session table 13, for example.

The above values of the flag are one example. It can be assumed that the value indicating that the bandwidth adjusting process has already performed is "0" and the value indicating that the bandwidth adjusting process has not been performed yet is "1".

As explained above, by performing the service notification described above, even when the multiple units of the bandwidth adjusting apparatus 1 are to be used, the bandwidth adjustment is performed preferentially for the packet with information indicating the at the bandwidth adjusting process has not been performed yet stored, referring to the service information such as the service notification flag. As a result, the bandwidth adjusting process is distributed to each of the multiple units of the bandwidth adjusting apparatus 1 provided in the communication system, which makes it possible to perform the bandwidth adjusting process for more sessions.

[Session Management]

As described earlier in the explanation of the packet discriminating process in FIG. 10, the bandwidth adjusting apparatus 1 according to the embodiment regards the packet determined as a TCP packet as the target of the throttling and enhancing of the bandwidth. The bandwidth adjusting apparatus 1 identifies the TCP communication in units of flow by "Per Flow Queuing", manages the sessions per TCP session and performs the process such as the bandwidth adjustment. As explained with reference to FIG. 3, the bandwidth adjusting apparatus 1 manages the TCP session using the session table 13. The managing method of the session is specifically explained below.

Figure 26:
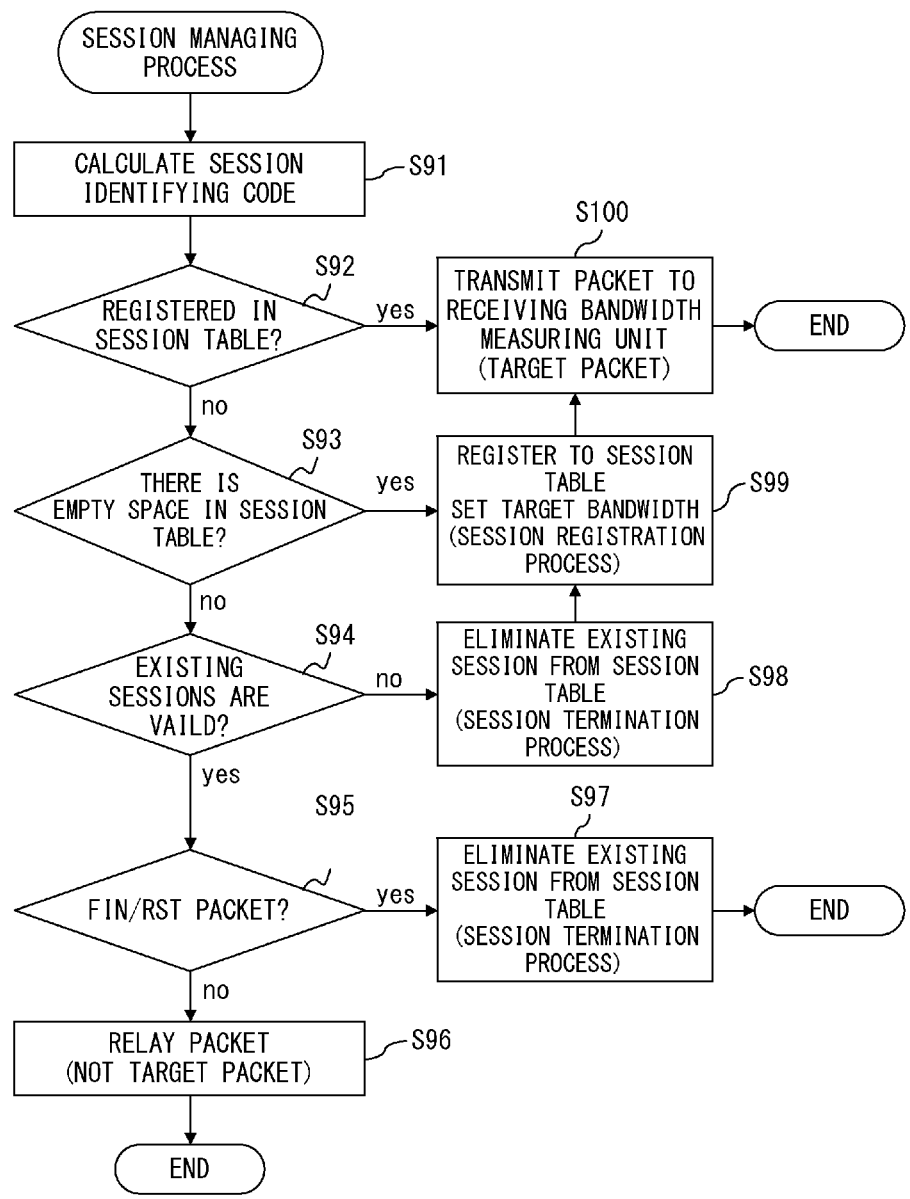
FIG. 26 is a flowchart presenting a session managing process.

FIG. 26 is a flowchart illustrating the session managing process by the session managing unit 22 in FIG. 3. The session managing unit 22 starts the process illustrated in FIG. 26 with the reception of a packet from the packet discriminating unit 21 that determined that the received packet is a TCP packet as a trigger.

First, in step S91, a session identification code is calculated. The session identification code is information for identifying which session the TCP packet belongs to. The specific method of obtaining the session identification code is described later.

In step S92, whether or not the session identification code obtained in step S91 is registered in the session table 13 is determined. If the session identification code has already been registered in the session table 13 (if yes in step S92), since the session has been subjected to the bandwidth measurement/bandwidth adjustment in the bandwidth adjusting apparatus 1, new registration is not required, and the step proceeds to step S100. In step S100, the packet is forwarded to the receiving bandwidth measuring unit 23, and the process is terminated.

If the session identification code obtained in step S91 has not been registered in the session table 13 yet in the determination in step S92 (if no in step S92), the registration to the session table 13 is required, and the process proceeds to step S93. In step S93, whether or not there is any empty space in the session table 13 is determined. If there is any empty space (yes in step S93), the process proceeds to step S99, and a session registering process is performed. Specifically, the session identification code, the target bandwidth according to the session and other necessary information are registered in the session table 13, and the process proceeds to step S100. The process in step S100 is as described above.

When a session is registered to the session table 13 in the session registering process in step S99, the setting of the initial value of the target bandwidth is performed. The configuration may be made so that, as the initial value, a predetermined initial value is selected from a plurality of values that are defined in advance, based on conditions such as the range of the IP address and the TCP port number and the like.

If there is no empty space in the session table 13 (if no in step S93), the process proceeds from step S93 to step S94, where whether or not the existing sessions, that is, the sessions registered in the session table 13 are valid is determined. If any invalid session is included (no in step S94), the process proceeds from step S94 to step S98, where the session termination process is performed, and the process proceeds to step S99. Specifically, a termination notification is transmitted to the terminal being the transmission destination of the packet and the invalid session is eliminated from the session table 13, and the process proceeds to step S99. The processes in and after S99 are as described above.

If all the sessions registered in the session table 13 are valid (if yes in step S94), the process proceeds from step S94 to step S95. Then, in step S95, whether or not the packet whose session identification code was obtained in step S91 is an FIN packet or an RST packet is determined. In step S95, the determination is made by referring to the code bit in the TCP header.

If the packet is an FIN packet or an RST packet in the determination in step S95 (if yes in step S95), the process proceeds to step S95 to step S97, there the session termination process is performed. Specifically, a termination notification is transmitted to the terminal being the transmission destination of the packet, and using the session identification code obtained in step S91, the corresponding session is obtained, information about the corresponding session is eliminated from the session table 13, and the process is terminated.

If the packet is neither an FIN packet nor an RST packet (if no in step S95), the process proceeds from step S95 to step S96, where the packet is relayed as it is without being subjected to the bandwidth measurement/bandwidth adjustment, and the process is terminated.

Meanwhile, the session identification code obtained in step S91 is calculated, for example, using the pair of the IP address and the TCP port number. The length of the pair of the IP address and the TCP port is 10 bytes for Ipv4 and 34 bytes for IPv6, and a session identification code of about 4 bytes is generated from them. As illustrated in the explanation of the flowchart in FIG. 26, the search in the session table 13 is performed using the session code identification code.

In the embodiment, in order to perform the search in the session table 13 efficiently, a known hash table is used. In this case, the session identification code is a hash value.

Specifically, a hash value is obtained from the IP address and the TCP port number, and the obtained value is regarded as the session identification code. To generate a session identification code that is appropriate as a hash value, for example, by using checksum, CRC (Cyclic Redundancy Check) code and the like, the value of the generated code may be differed reasonably.

Alternatively, a value obtained by integer addition of information of the pair of the IP address and the TCP port number may be regarded as the session identification code. Even with such a generation method of the code, the code value may be differed adequately in practice. And in this case, the entire time required for the code generation process is, if processed by a microprocessor operating at 1 GHz, about 10 nanoseconds for about 10 instructions of machine language instructions.

As described above, according to the session managing method according to the present embodiment, the bandwidth adjusting apparatus 1 obtains the session identification code every time when it receives a packet, and determines whether or not the obtained session identification code is registered in the session table 13. If the obtained session identification code has not been registered in the session table 13, new registration to the session table 13 is performed, and if it has already been registered, the measurement of the bandwidth and the bandwidth adjustment are performed using the registered information. Thus, with the bandwidth adjusting apparatus 1 according to the embodiment, as long as the TCP session being continued can be recognized, the measuring and adjusting processes of the bandwidth may be performed tracking the sequence number and the ACK number, and there is no need to monitor/track the state transition of the TCP communication. Therefore, by adopting the session managing method described above, the load put on the bandwidth adjusting apparatus 1 may be reduced.

[Monitoring of the Session/Elimination of the Session]

The TCP communication is, generally, terminated by an FIN packet and an RST packet. This is as in step S95-step S97 in FIG. 26. However, other than this, due to factors such as the abnormal termination of the terminal (the transmitting terminal 2A and the receiving terminal 4B), the disconnection of the network and the like, the communication may be left without being terminated in a normal way. Even if the communication is left without being terminated in a normal way, eventually, it may be terminated due to the time-out at the terminal.

Accordingly, as the processes in step S94-step S98 in FIG. 26, information, corresponding to the session in which any packets have not arrived for a predetermined period or longer, is eliminated from the session table 13 at the timing of registration of a new session. Alternatively, by searching the session table 13 at the interval of a predetermined time, information is eliminated if there is a session in which any packets have not arrived for the predetermined period.

Thus, by recognizing that communication has been left without being terminated in a normal way and eliminating registered information from the session table 13, it becomes possible to exclude the unnecessary usage of the area of the session table 13 and to perform the bandwidth adjustment for more sessions.

Meanwhile, at a timing to perform the new registration of a session or in the case a session in which the packet has not been arrived is found for more than a predetermined period as a result of monitoring having been performed, the bandwidth adjusting apparatus 1 eliminates information from the session table 13, sends notification to the terminal that the communication is to be terminated, and performs the communication termination process. In order to perform the communication termination process, the monitoring time of the TCP session is by a timer in advance. If there is a session for which the set time has passed, information about the session is eliminated from the session table 13, and the termination notification is sent to the terminal. For example, the termination notification is performed by transmitting an RST packet including "RST" what is one of TCP commands. The terminal that received the RST packet performs a forced termination of the TCP session.

As described above, if a TCP session becomes unrecoverable due to a breakdown in communication and a problem in a terminal, the server and the client terminal performs a forced termination of the TCP session that has become unrecoverable, according to the termination notification received from the bandwidth adjusting apparatus 1. With a web server as an example, it 100,000 sessions need to be managed. Therefore, by performing a forced termination of the session that has become unrecoverable from a failure, it becomes possible to significantly reduce the processing load put on the server with a large amount of access.

[Session Management in a Case in which the Service Notification is Performed]

The distribution of the bandwidth adjusting process among the multiple units of the bandwidth adjusting apparatus 1 using the service notification information is as explained earlier. Here, the method to use the service notification information when managing the session is explained.

Figure 27:
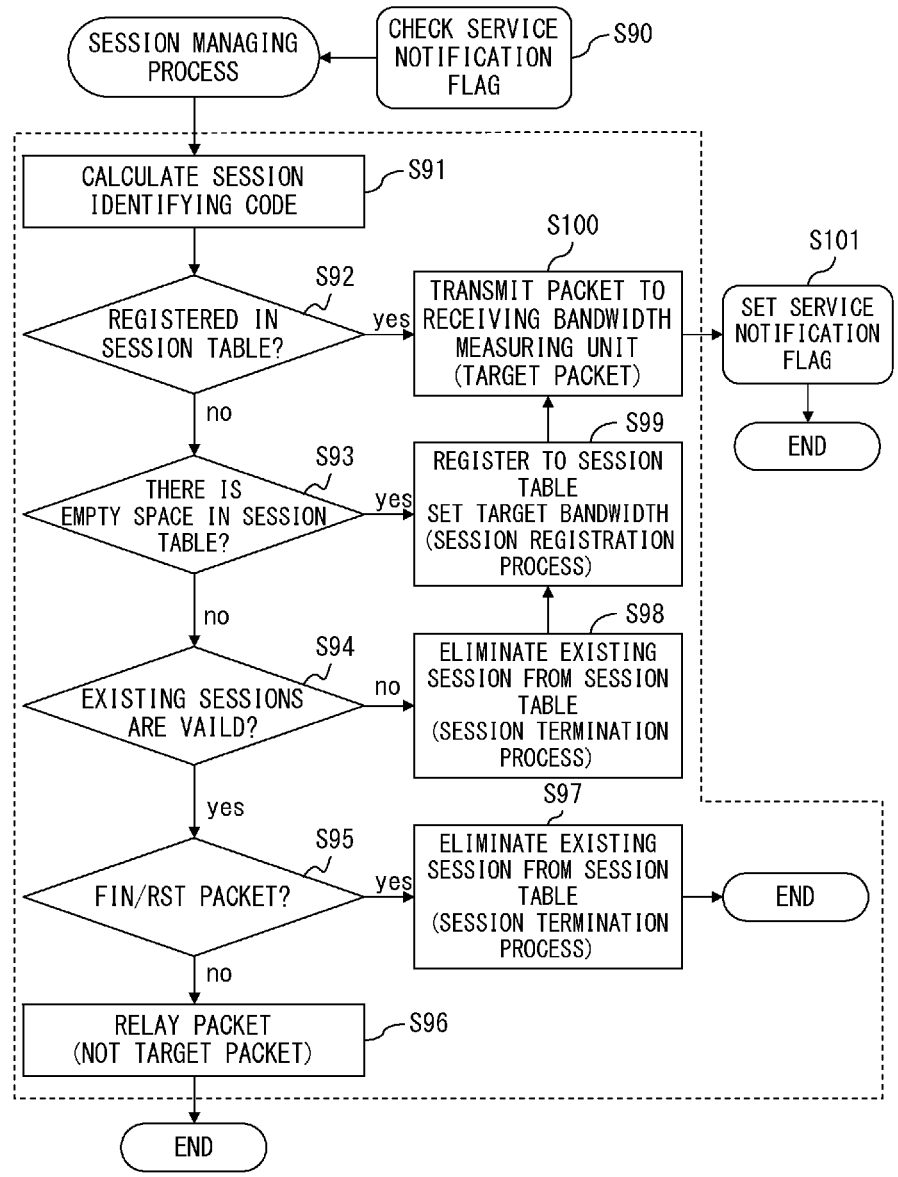
FIG. 27 is a flowchart presenting the session managing process using the service notification information.

FIG. 27 is a flowchart illustrating the session managing process using the service notification information. Here, a case in which the service notification flag illustrated in FIG. 24 and FIG. 25 is used as the service notification information is presented.

In the series of processes illustrated in FIG. 27, since the processes in step S91-step S100 are similar to step S91-step S100 in FIG. 26 respectively, explanation for them is omitted here, and the processes that are different from those in FIG. 26 are explained.

In step S90, the TCP header of the packet received from the packet discriminating unit 21 is referred to, and if a value indicating that the bandwidth adjustment has not been performed yet is stored in the service notification flag, the process proceeds to step S91. And the session managing process in and after step S91 described above is performed. If a value indicating that the bandwidth adjusting process has already been performed is stored in the service notification flag, the packet is regarded as excepted from the session management target in the session managing unit 22, the process is terminated with no particular process performed.

When the packet is forwarded to the receiving bandwidth measuring unit 23 and the process to be performed regarding the management of the session is completed in step S100, the value indicating that the bandwidth adjustment has already been performed is set in the service notification flag in step S101, and the process is terminated.

Figure 28:
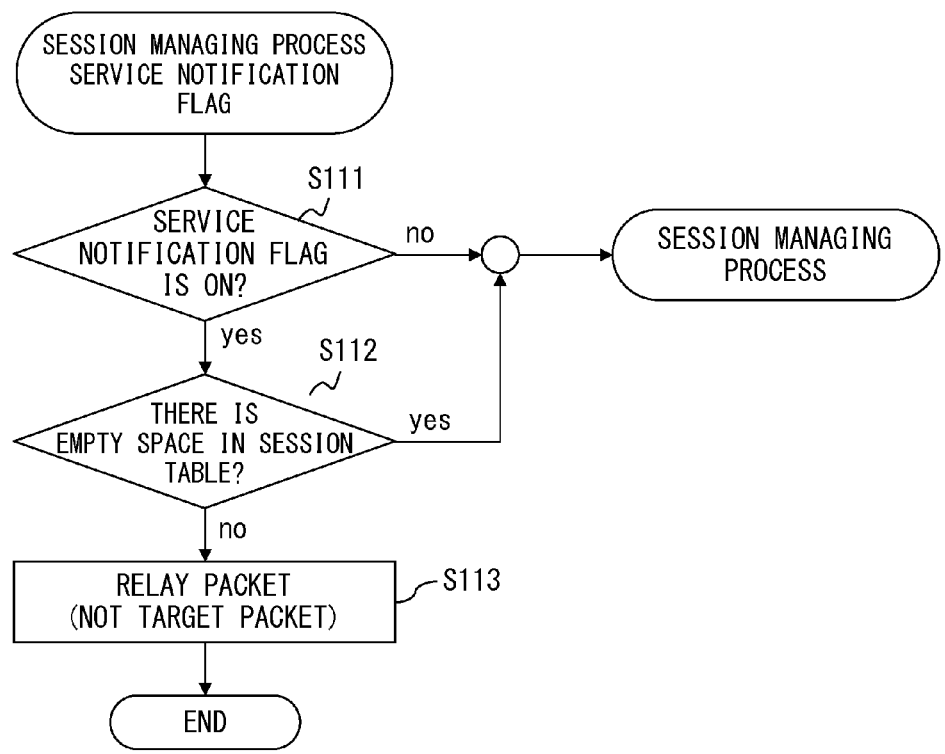
FIG. 28 is a flowchart presenting a service notification flag process.

FIG. 28 is a flowchart illustrating the service notification flag process. FIG. 28 is a detailed flow of a service notification flag check process in step S90 in the session managing process in FIG. 27.

First, in step S111, whether or not the service notification in the TCP header is on, that is, whether or not the value indicating that the bandwidth adjusting process has already been performed is stored in the service notification flag is determined. If the service notification flag is off, that is, if the value indicating that the bandwidth adjusting process has not been performed yet is stored in the service notification flag (if no in step S111), the process proceeds to the session managing process in and after step S91 in FIG. 27.

Meanwhile, if the service notification flag is on (if yes in step S111), the process proceeds to step S112, and whether or not there is any empty space in the session table 13 is further determined. If there is any empty space in the session table 13 (if yes in step S112), the process proceeds to the session managing process in and after step S91 in FIG. 27.

If there is no empty space in the session table 13 (if no in step S112), the process proceeds to step S113, where the packet is relayed without being subjected to the bandwidth measurement/bandwidth adjustment, and the process is terminated.

Meanwhile, the process to determine whether or not there is any empty space in the session table 13 in step S112 is performed because, even if a packet has already been subjected to the bandwidth adjusting process (even if yes in step S111), if there is any empty space in the session table 13, it is determined that the bandwidth adjustment may be performed, and to perform the session managing process in and after step S91 in FIG. 27.

In addition, while whether or not there is enough empty space to newly register information corresponding to one session to the session table 13 is determined in step S112, this is not a limitation. For example, the configuration may be made so that a predetermined ratio or a threshold may be set, and whether or not the empty space in the session table 13 is less than the predetermined ratio or the threshold is determined.

Thus, referring to the service notification flag, when the packet is determined as the process target in advance, the session managing process in and after step S91 is performed. In other words, for the packet that is not the process target for the bandwidth adjusting process 1, it is determined that the session managing process in and after S91 is not necessary, and the process is not performed. Accordingly, an effect to reduce the load put on the bandwidth adjusting process 1 is obtained.

[Activity Insertion/Activity Elimination]

As described earlier in explaining FIG. 26 and the like, the bandwidth adjusting apparatus 1 registers information in the session table 13 and starts the measurement of the bandwidth/bandwidth adjustment, with the reception of a TCP packet as a trigger. That is, the bandwidth adjusting apparatus 1 does not need to monitor the state transition of the TCP communication from "SYN" to "FIN/RST" for the bandwidth adjustment.

For this reason, even when the relay apparatus 3 having the bandwidth adjusting apparatus 1 is inserted into the network in the middle of a certain session, it is possible to perform the bandwidth adjustment from the received TCP packet. In addition, even if the relay apparatus 3 having the bandwidth adjusting apparatus 1 is removed or the relay apparatus 3 shuts down due to a fault and the like while the relay apparatus 3 is relaying communication, since the buffering process described above is performed, it does not negatively affect the TCP communication.

Here, the installment of the bandwidth adjusting apparatus 1 into the communication system during a session is referred to as "activity insertion", and the elimination of the bandwidth adjusting apparatus 1 from the communication system during a session is referred to as "activity elimination".

Since the activity insertion and the activity elimination can be performed for the bandwidth adjusting apparatus 1 according to the present embodiment, there is an effect also from the operation of the communication system.

[Session Table]

As described for the TCP session managing method above, upon performing the bandwidth adjustment for a received packet, the bandwidth adjusting apparatus 1 registers information regarding the session to the session table 13. Here, with reference to FIG. 29 and FIG. 30, the data structure of the session table 13 and the like is explained.

FIG. 29 is a diagram illustrating a structure example of the session table 13. The session table 13 illustrated in FIG. 29 is a hash table (one-dimensional array) storing session information of the both directions of the direction from the transmitting terminal 2A to the receiving terminal 4B and its opposite direction, which stores session table data in association with an index.

In the embodiment, the identification of session information is enabled by setting the value of the remainder of dividing the hash key code by the size of the table as the index of the hash table. Such a method of obtaining the index uses a known technique. The hash key code is obtained from the pair of the IP address and the TCP port number as described above.

FIG. 30 is a diagram illustrating a configuration example of a session table data. The session table data associated with the index of the hash table is provided for each session, and includes managing information D1, data D2 indicating the location of session information in the opposite direction, data D3 regarding the IP address and the TCP port number of the transmission source and the transmission destination of the packet, time data D4 (D4-1 and D4-2), a unit time D5, measured bandwidth data D6, target bandwidth data D7, relay bandwidth data D8, data D9 regarding the sequence number, data D10 regarding the ACK number, the buffer data D11 of the packet.

The managing information D1 is information that the session managing unit 22 of the bandwidth adjusting apparatus 1 uses for managing the session table 13.

The data D2 indicating the location of session information in the opposite direction stores the location on the session table 13 of the session information that is paired with the session information illustrated in FIG. 30, that is, the "index" in FIG. 29. Each part of the bandwidth adjusting apparatus 1 such as the session managing unit 22 accesses the session information of the opposite direction using the data D2. The data D2 is invalid when the traffic of the opposite direction is not relayed.

The data D3 regarding the IP address and the TCP port number of the transmission source and the transmission destination of the packet includes the hash key code (session identification code), the transmitting IP address, the receiving IP address, the transmitting port number and the receiving port number.

Meanwhile, in the data D3, the IP address and the TCP port number of the transmission source and the transmission destination, and in the embodiment, the session identification code being the hash key code is obtained using the pair of the IP address and the TCP port number. For this reason, regarding the data D2 indicating the location of session information in the opposite direction, it is also possible to calculate, using the data D3, while switching transmitting/receiving of the IP address and the TCP port number. However, by storing the value obtained in advance in the area of the data D2, the time required for generating the hash code may be reduced.

The time data D4 includes various time information regarding the bandwidth adjustment, such as the session start time, the relay time of the data packet and the relay time of the ACK packet and the like. For example, a general time value is used such as a time value in units of microseconds and a time value for timing by minimum timer interruption of the operation system such as Jiffy. For example, a session continuation time is obtained from the difference between the current time and the session start time, and the elimination process of the session and the like is performed using the obtained session continuation time.

The unit time D5 is a numerical value representing the length of the unit time of the internal time in the network device (the relay apparatus 3 in the example above) having the bandwidth adjusting apparatus 1 and the terminal and the like. Since the unit time may differ in every session, it is set for each session in the embodiment.

The measured bandwidth data D6 stores the bandwidth measured in the receiving bandwidth measuring unit 23, and respectively stores the measured data amount, the maximum measured data amount, the minimum measured data amount, the ACK amount, the maximum ACK amount and the minimum ACK amount per unit time. The measured data amount and the ACK amount per unit time is the traffic amount measured by the receiving bandwidth measuring unit 23 within the period of the unit time D5, and as their respective maximum value and minimum value, the past maximum value and minimum value are recorded.

In the target bandwidth data D7, information representing the total amount of the data packet and the increment of the ACK packet to be relayed in the unit time, that is, the target bandwidth is stored. As value of each item of the target bandwidth data, a predetermined initial value is stored when the session managing unit 22 newly registers information to the session table 13, and the value is changed according to the measurement result of the communication bandwidth of the opposite direction for example. As explained for the measuring method of the bandwidth, the transferable data amount per unit time is the accumulation of the data amount. In contrast to this, the transferable ACK amount per unit time is not the increment of the ACK packet length but the increment of the ACK.

The relay bandwidth data D8 stores the bandwidth of the packet relayed by the bandwidth adjustment by the bandwidth adjusting unit 24, and includes the relay data amount, the maximum relay data amount, the minimum relay data amount, the relay ACK amount, the maximum relay ACK amount and the minimum relay ACK amount per unit time. The data amount and the ACK amount consist of the accumulation of the data mount and the increment of the ACK, respectively, in a similar manner to the measured bandwidth and the target bandwidth. Meanwhile, if the ACK does not increase, the relay ACK amount is "0". In addition, if the ACK amount decreases due to the switch in the order of the ACK packet, the ACK amount is measured while ignoring the corresponding ACK packet.

The data D9 regarding the sequence number stores the sequence number of the data packet buffered in the buffer unit 14, and in the example illustrated in FIG. 30, stores the largest sequence number and the smallest sequence number among the sequence numbers of the buffered data packets. With the data D9, the analysis of the packets buffers in the buffer unit 14 becomes unnecessary, and the process in the bandwidth adjusting apparatus 1 is reduced.

The data D10 regarding the ACK number stores the ACK number of the ACK packet buffered in the buffer unit 14, and in the example illustrated in FIG. 30, stores the largest ACK number among the ACK numbers of the buffered ACK packets.

The buffer data D11 stores the data packet and one ACK packet in the queue.

As illustrated in FIG. 30, the session table data is 128 bytes per communication in one direction and 256 bytes for two directions. Assuming that memory is 1 megabyte, 4096 sessions may be registered. At the current technology level, the session table 13 may be realized easily, with 25 megabytes for 100,000 sessions and 256 megabytes for 1 million sessions.

[Setting of the Target Bandwidth]

The target bandwidth used in the bandwidth adjusting process is stored in the session table 13 as illustrated in FIG. 30. The configuration may be made so that the initial value of the target bandwidth is, for example, selected from values defined in advance, according to the range of the values of the IP address and the port number. By determining the target bandwidth by the IP address and the port number, it becomes possible to set the target bandwidth based on each communication. Such a process is performed by the session managing unit 22 for example.

Once the bandwidth adjusting apparatus 1 recognizes the reception of the TCP packet and starts the bandwidth adjusting process, it is also possible to dynamically change the target bandwidth after that. The timing for the change include, for example, when the session table 13 is referred to in a certain packet process, when the regular interrupt process illustrated in FIG. 12 is performed, when the administrator of the bandwidth adjusting apparatus 1 intentionally changes, and the like. In either case, the data amount that may be forwarded per unit time and the ACK amount that may be forwarded per unit time in the data D7 are set as needed, referring to the session table data (FIG. 30) at that point of time. Such a process is performed by the receiving bandwidth measuring unit 23 and the like for example.

Setting the target bandwidth dynamically enables to adjust the bandwidth using more reasonable target bandwidth according to the actual communication.

As described above, according to the bandwidth adjusting apparatus 1 according to the present embodiment, the bandwidth adjusting apparatus 1 monitors the packet going through the bandwidth adjusting apparatus 1, makes a comparison between the target bandwidth indicating the bandwidth required for the communication and the measured actual bandwidth, and performs the throttling and enhancing of the bandwidth based on the comparison. When the measured bandwidth exceeds the target bandwidth, the transmission timing of the packets is controlled to "throttle" the bandwidth so that the packets are transmitted at a certain interval, that is, the target bandwidth. On the other hand, when the measured bandwidth is below the target bandwidth, the bandwidth is "enhanced" by retransmitting the packet buffered in advance to the transmitting terminal 2A and the receiving terminal 4B by proxy. By the throttling of the bandwidth, the communication performance is throttled within a predetermined range, which leads to the effective throttling of the occurrence of burst traffic and the like, and variation in the communication performance among terminals is throttled. Accordingly, it becomes possible to improve the communication performance that is originally about 1 Mbps to about several Mbps. In addition, by the enhancing of the bandwidth, the packet transmission by the terminal is enhanced, which effectively throttles the increase in packet retransmission and in traffic due to the packet retransmission. Thus, by performing the throttling or the enhancing of the bandwidth so as to make the actual bandwidth approach to the target bandwidth, it becomes possible, regarding the communication that goes through the bandwidth adjusting apparatus 1, to limit the communication performance within a predetermined range and to throttle the retransmission of the packet effectively, which has an effect for stabilization of the communication.

While the IP network, such as the Internet and the like, is a network base that provides "communication without reliability". Under this network, the bandwidth adjustment described above is performed for the communication that provides the "communication with reliability" such as the TCP. Conventionally, when the network speed significantly differs by each terminal, unbalance occurs in the communication quality provided among the terminals. For example, while the server providing the service is connected to a high-speed network, the user-side terminal is generally connected to a relatively low-speed access network. In such an unbalanced environment, by performing the enhancing and the throttling of the bandwidth described above, the communication between terminals performing the "communication with reliability" is improved.

In addition, according to the bandwidth adjusting apparatus 1 according to the present embodiment, since it is also possible to monitor the packet in one direction only of the communication in the two directions and to use it for the bandwidth adjustment of the other direction, there is no need to provide a paired apparatus. In addition, the installment may be made in any place on the path, the network design cost may be reduced. Furthermore, even when multiple units of the bandwidth adjusting apparatus 1 is provided, since each apparatus monitors the packet flowing through the apparatus itself and performs the bandwidth adjustment, no interruption to each other occurs between the apparatuses. Rather, by performing the bandwidth adjustment in each of the plurality of the bandwidth adjusting apparatuses 1, the bandwidth adjustment is performed at a plurality of places on the path, making it possible to further stabilize the TCP communication.

Furthermore, without making a change to the TCP/IP packet that affects the communication, the bandwidth adjusting process may be performed using only the packet operation allowed in the "communication without reliability" in the IP layer and with the relay and the like in only one direction of the TCP communication. Such a bandwidth adjusting process may be realized by relatively simple software, and accordingly, the bandwidth adjusting apparatus 1 may be incorporated into any network connection device having the communication function such as a router, a bridge, a network appliance device, a terminal and the like.

Meanwhile, in the embodiment, since the case of incorporating the bandwidth adjusting apparatus 1 into the relay apparatus 3 is explained as an example, how to "relay" the packet and to perform the bandwidth adjustment is described. In the case of incorporating the bandwidth adjusting apparatus into the terminal, the bandwidth adjusting apparatus 1 sets the packet that the apparatus itself transmits and the packet that the apparatus itself receives as the target of the bandwidth measurement/bandwidth adjustment and the like, and may be realized by "transmitting" the packet in the method described above. Regarding the monitoring and eliminating processes of the session, an unrecoverable session is terminated with the terminal sending the termination notification from the bandwidth adjusting apparatus in the apparatus itself to the TCP layer.

Furthermore, in the bandwidth adjusting process by the bandwidth adjusting apparatus 1, even in the case in which the bandwidth adjusting apparatus 1 is provided in the relay apparatus 3, the relay TCP is not terminated as in the conventional TCP technique. In addition, the bandwidth adjusting process is not dependent on the existing TCP/IP process function. The bandwidth adjusting apparatus 1 is capable of performing the bandwidth adjusting process by referring to the control information of the received TCP/IP packet, and requires no complicated process. For this reason, even in the case in which the bandwidth adjusting apparatus 1 is incorporated into the relay apparatus 3, it becomes easy to implement a high-speed TCP splicing in the corresponding relay apparatus 3. Therefore, it has an effect to improve the scalability of the processing performance. In addition, by the improvement of the scalability of the processing performance, it becomes possible to perform the bandwidth adjustment while managing each session, even in a backbone network that aggregates a lot of traffic.

Then, since the bandwidth adjusting apparatus 1 recognizes the session based on whether or not the received packet is a TCP packet, and performs the bandwidth adjustment in units of sessions, there is no need to refer to the TCP header to determine the condition of the TCP communication. Accordingly, even when the communication is continued between the transmitting terminal 2A and the receiving terminal 4B, it becomes possible to install the bandwidth adjusting apparatus 1 additionally in the communication system and to eliminate it from the communication system, without discontinuing the communication. Therefore, it becomes possible to realize the stabilization of the TCP communication without degrading the reliability of the network due to the addition and elimination of the bandwidth adjusting apparatus 1.

Meanwhile, while the method to perform the bandwidth adjustment in the case of using the TCP explained as an example for the communication between the transmitting terminal 2A and the receiving terminal 4B, this is not a limitation. For example, the bandwidth adjusting method described above may also be applied in the same manner to the case of performing communication using the SCTP (Stream Control Transmission Protocol) and the XTP (Xpress Transport Protocol) for example.

The invention claimed is:

1. A communication apparatus configured to control a bandwidth of communication when a transmitting apparatus and a receiving apparatus perform communication via a network, comprising:
   a measuring unit configured to measure the bandwidth for communication of at least one direction of two directions, a first direction from the transmitting apparatus to the receiving apparatus and a second direction from the receiving apparatus to the transmitting apparatus, the measuring of bandwidth by observing at the communication apparatus (i) for the first direction an accumulated data length of a series of first packets sent from the transmitting apparatus, and/or (ii) for the second direction counting the increment of a number indicated by a series of second packets, each second packet sent by the receiving apparatus back to the transmitting apparatus to confirm receipt of a corresponding first packet;
   a storing unit configured to store information regarding bandwidth adjustment including a target bandwidth indicating a bandwidth required for communication;
   an adjusting unit configured to read out, from the storing unit, the target bandwidth of the direction for which the bandwidth was measured, and based on a comparison of the bandwidth measured at the measuring unit and the read out target bandwidth, to perform throttling or enhancing of the bandwidth by controlling the transmission interval of the first and/or second packets when relaying or transmitting the first and/or second packets, or duplicates thereof, from the communication apparatus.

2. The communication apparatus according to claim 1, wherein
   the adjusting unit is configured to perform throttling or enhancing of the bandwidth by extending or shortening the transmission interval of the second packets respectively.

3. The communication apparatus according to claim 2, wherein
the number indicated by each second packet indicates the first packet that the transmitting apparatus should transmit next; and
the adjusting unit is configured to perform throttling or enhancing of the bandwidth by controlling the transmission interval of the second packet so that the increment in the number becomes closer to the target bandwidth.

4. The communication apparatus according to claim 1, further comprising
a packet storing unit configured to store a first packet of the series of first packets and a second packet of the series of second packets, according to information included in the first and second packets indicating an order of the packet;
wherein
the adjusting unit is configured to compare, upon receiving a packet via the network, the information indicating an order of the packet of the received packet and the information indicating an order of the packet of a packet stored in the packet storing unit; and
when the information indicating an order of the packet match each other, discards one of either the packet stored in the packet storing unit or the received packet, and stores the other packet in the packet storing unit.

5. The communication apparatus according to claim 4, wherein
the adjusting unit is configured to duplicate the packet stored in the packet storing unit when the bandwidth in a transmission direction of the first or the second packet is below the target bandwidth for the communication direction, and transmits the duplicate packet at a transmission interval based on the target bandwidth at least once.

6. The communication apparatus according to claim 5, wherein
when the second packet is not recognized for more than a predetermined period, the adjusting unit obtains from the packet storing unit, the first packet whose number indicating an order of the first packet corresponds to the largest number among numbers indicating an order of the second packet, and transmits a duplicate packet of the obtained first packet to the receiving apparatus.

7. The communication apparatus according to claim 5, wherein
when the first packet is not recognized for more than a predetermined period, the adjusting unit obtains from the packet storing unit, the second packet whose number indicating an order of the second packet is the largest number, and transmits a duplicate packet of the obtained second packet to the transmitting apparatus.

8. The communication apparatus according to claim 5, wherein
the adjusting unit improves the transmitting bandwidth at the transmitting apparatus by transmitting duplicate packets continuously more than a predetermined number of times for the second packets having a same number indicating an order of the packet.

9. The communication apparatus according to claim 1, wherein
the measuring unit and the adjusting unit has a first measuring unit and a first adjusting unit configured to perform bandwidth measurement and bandwidth adjustment, respectively, for one of the first and second communication directions between the transmitting apparatus and the receiving apparatus, and a second measuring unit and a second adjusting unit configured to perform bandwidth measurement and bandwidth adjustment, respectively, for the other of the first and second communication directions; and
by running the measuring unit and the adjusting unit to perform bandwidth adjustment in the direction of the two communication directions in which a packet is recognized.

10. The communication apparatus according to claim 4, wherein
among the second packets received from the receiving apparatus, the adjusting unit does not send a packet that is to be discarded in the transmitting apparatus, and discards the packet in the apparatus itself.

11. The communication apparatus according to claim 1, further comprising
a managing unit configured to perform registration of information to the storing unit with reception of a packet from the transmitting apparatus and the receiving apparatus as a trigger, and starts management of a session between the transmitting apparatus and a receiving apparatus;
wherein
the storing unit stores information regarding bandwidth adjustment for the session, associating with information identifying the session between the transmitting apparatus and the receiving apparatus.

12. The communication apparatus according to claim 11, wherein
the session managing unit refers to information included in the packet representing a state transition of communication, and if a value indicating termination of the session between the transmitting apparatus and the receiving apparatus is stored in the information representing the state transition, eliminates the information identifying the session and the associated information regarding bandwidth adjustment from the storing unit, and generates and transmits, to the transmitting apparatus or the receiving apparatus being a transmission destination of the packet, a notification packet notifying termination of communication.

13. The communication apparatus according to claim 11, wherein
when the session managing unit has not recognized a packet related to a session that is being managed for more than a predetermined period, the session managing unit eliminates the information identifying the session and the associated information regarding bandwidth adjustment from the storing unit, and generates and transmits, to the transmitting apparatus and the receiving apparatus, a packet notifying termination of communication.

14. The communication apparatus according to claim 1, comprising:
wherein the adjusting unit sets, for the packet for which bandwidth adjustment has been performed, information indicating that a bandwidth adjusting process has already been performed, and based on whether or not the information is set for a received packet, determines whether or not the received packet is subject to bandwidth adjustment.

15. The communication apparatus according to claim 14, wherein
the adjusting unit sets 0 in an URGENT bit of a TCP (transmission Control Protocol) header of the packet, sets information indicating that a bandwidth adjusting process has already been performed in an URGENT pointer field, and sets a value including a value of the set information in a checksum field of the packet.

16. The communication apparatus according to claim 1, wherein
the measuring unit compares the measured bandwidth and the target bandwidth, and if the measured bandwidth exceeds the target bandwidth, increases the target bandwidth within an allowable range of the target bandwidth set in advance, and if the measured bandwidth is below the target bandwidth, reduces the target bandwidth within the allowable range, and stores the changed target bandwidth in the storing unit.

17. The communication apparatus according to claim 11, wherein
the managing unit changes the target bandwidth of a session being managed based on a range of a network address of a packet, a type of a communication protocol, a duration of communication, time period, the measured bandwidth or a transmitted data amount, and stores the changed target bandwidth in the storing unit.

18. A communication method to control a bandwidth of communication when a transmitting apparatus and a receiving apparatus perform communication via a network, comprising:
measuring the bandwidth for communication of at least one direction of two directions, a first direction from the transmitting apparatus to the receiving apparatus and a second direction from the receiving apparatus to the transmitting apparatus, the measuring of bandwidth by observing at the communication apparatus (i) for the first direction an accumulated data length of a series of first packets sent from the transmitting apparatus, and/or (ii) for the second direction counting the increment of a number indicated by a series of second packets, each second packet sent by the receiving apparatus back to the transmitting apparatus to confirm receipt of a corresponding first packet; and
reading out, from a storing unit configured to store information regarding bandwidth adjustment including a target bandwidth indicating a bandwidth required for communication, the target bandwidth of the direction for which the bandwidth was measured, and based on a comparison of the bandwidth measured at the measuring unit and the read out target bandwidth, to perform throttling or enhancing of the bandwidth by controlling the transmission interval of the first and/or second packets when relaying or transmitting the first and/or second packets, or duplicates thereof, from the communication apparatus.

19. The communication method according to claim 18, further comprising:
setting, for the packet for which bandwidth adjustment has been performed, information indicating that a bandwidth adjusting process has already been performed, and based on whether or not the information is set for a received packet, determining whether or not the received packet is subject to bandwidth adjustment.

* * * * *